(12) United States Patent  (10) Patent No.: US 6,183,050 B1
Ganzel  (45) Date of Patent: Feb. 6, 2001

(54) BRAKING SYSTEM WITH REMOTE BOOST VALVE

(75) Inventor: Blaise J. Ganzel, Ann Arbor, MI (US)

(73) Assignee: Kelsey-Hayes Company, Livonia, MI (US)

(*) Notice: Under 35 U.S.C. 154(b), the term of this patent shall be extended for 0 days.

(21) Appl. No.: 09/474,397

(22) Filed: Dec. 29, 1999

Related U.S. Application Data

(63) Continuation of application No. PCT/US98/13668, filed on Jun. 30, 1998.
(60) Provisional application No. 60/051,240, filed on Jun. 30, 1997, and provisional application No. 60/072,615, filed on Jan. 26, 1998.

(51) Int. Cl.[7] .............................. F16D 31/92; B60T 8/32; B60T 8/40; B60T 8/94
(52) U.S. Cl. ......................... 303/114.1; 188/358; 303/3; 303/10; 303/13; 303/116.1; 303/119.1; 303/50; 303/14; 303/113.2; 303/DIG. 11
(58) Field of Search .......................... 303/114.1, 113.2, 303/152, 50, DIG. 11, 119.1, 3, 113.3, 15, 10, 116.1, 14, 13, 113.1, 155, 114.2, 115.1, 115.2, 115.4, 115.5, 113.4, 119.2, 119.3; 188/358, 359; 60/547.1, 550, 565, 566

(56) References Cited

U.S. PATENT DOCUMENTS

| | | | |
|---|---|---|---|
| 4,489,989 | * | 12/1984 | Belart et al. . |
| 4,655,511 | * | 4/1987 | Leiber ................................. 303/50 |
| 4,730,877 | * | 3/1988 | Seibert et al. ...................... 188/358 |
| 4,787,685 | * | 11/1988 | Klein ................................. 303/114.1 |
| 4,938,541 | * | 7/1990 | Shaw et al. ....................... 303/114.1 |
| 5,312,172 | * | 5/1994 | Takeuchi ........................... 303/113.1 |
| 5,531,509 | * | 7/1996 | Kellner et al. ..................... 303/114.1 |
| 5,544,948 | * | 8/1996 | Schmidt et al. . |
| 5,567,021 | * | 10/1996 | Gaillard ............................ 303/114.1 |
| 5,887,954 | * | 3/1999 | Stainer et al. .................... 303/113.4 |
| 5,941,608 | * | 8/1999 | Campau et al. .................. 303/115.4 |
| 6,007,160 | * | 12/1999 | Lubbers et al. ...................... 188/358 |
| 6,053,582 | * | 4/2000 | Ganzel .............................. 303/114.1 |

FOREIGN PATENT DOCUMENTS

WO9900281 * 1/1999 (WO) .

* cited by examiner

Primary Examiner—Douglas C. Butler
(74) Attorney, Agent, or Firm—MacMillan, Sobanski & Todd, LLC

(57) ABSTRACT

A brake system including a master cylinder for generating pressurized fluid, a wheel brake in fluid communication with the master cylinder, and a first valve for regulating the flow of fluid between the master cylinder and the wheel brake. The brake system further includes a pedal travel simulator including a housing having a bore formed therein. A piston is slidably disposed in the bore. The piston and the housing generally defining a fluid chamber which is in fluid communication with the master cylinder. The pedal travel simulator further includes a spring which biases the piston in a direction so as to contract the fluid chamber. The brake system further includes a source of pressurized fluid and a boost valve which is in fluid communication with the source of pressurized fluid and the wheel brake. The boost valve is actuated by the spring of the pedal travel simulator to supply pressurized fluid from the source of pressurized fluid to the wheel brake at a pressure ratio greater than fluid pressure generated by the master cylinder.

35 Claims, 21 Drawing Sheets

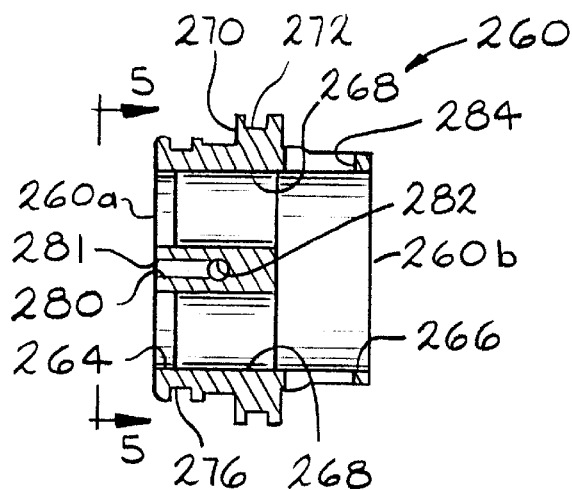
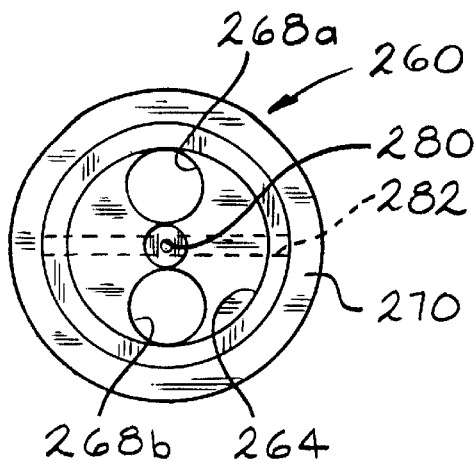
FIG. 4    FIG. 5
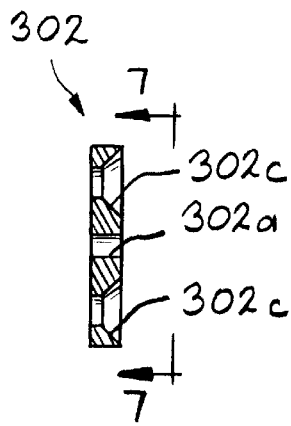
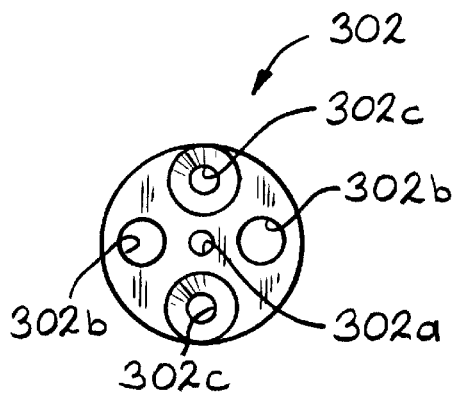
FIG. 6    FIG. 7

BRAKING SYSTEM WITH REMOTE BOOST VALVE

CROSS REFERENCE TO RELATED APPLICATIONS

This application claims the benefit of U.S. Provisional Application No. 60/051,240 filed Jun. 30, 1997, U.S. Provisional Application No. 60/072,615 filed Jan. 26, 1998. This application is a con of Patent Application No. PCT/US98/13668 filed Jun. 30, 1998.

BACKGROUND OF THE INVENTION

This invention relates in general to a vehicle brake systems and in particular to a brake system having a pilot-operated boost valve located remotely from a master cylinder.

Vehicles are commonly slowed and stopped with hydraulic brake systems. These systems vary in complexity but a base brake system typically includes a brake pedal, a tandem master cylinder, fluid conduits arranged in two similar but separate brake circuits, and wheel brakes in each circuit. The driver of the vehicle operates a brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Base brake systems typically use a brake booster which act during braking to provide a force to the master cylinder which assists the pedal force created by the driver. The booster can be vacuum or hydraulically operated. A typical hydraulic booster senses the movement of the brake pedal and generates pressurized fluid which is introduced into the master cylinder. The fluid from the booster assists the pedal force acting on the pistons of the master cylinder which generate pressurized fluid in the conduit in fluid communication with the wheel brakes. Thus, the pressures generated by the master cylinder are increased. Hydraulic boosters are commonly located adjacent the master cylinder piston and use a boost valve to control the pressurized fluid applied to the booster. Typically the boost valve is connected with the booster in the master cylinder assembly and mechanically coupled to the brake pedal for proper operation. Although this placement of the booster adjacent the master cylinder has been satisfactory in the past, it would be desirable to locate the booster remotely from the master cylinder because the tighter packaging constraints in the engine compartment of modem vehicles.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control.

Advances in braking technology have led to the introduction of Anti-lock Braking Systems (ABS). An ABS system monitors wheel rotational behavior and selectively applies and relieves brake pressure in the corresponding wheel brakes in order to maintain the wheel speed within a selected slip range to achieve maximum braking force. While such systems are typically adapted to control the braking of each, braked wheel of the vehicle, some systems have been developed for controlling the braking of only a portion of the plurality of braked wheels.

Electronically controlled ABS valves, comprising apply valves and dump valves, are located between the master cylinder and the wheel brakes. The ABS valves regulate the pressure between the master cylinder and the wheel brakes. Typically, when activated, these ABS valves operate in three pressure control modes: pressure apply, pressure dump and pressure hold. The apply valves allow pressurized brake fluid into respective ones of the wheel brakes to increase pressure during the apply mode, and the dump valves relieve brake fluid from their associated wheel brakes during the dump mode. Wheel brake pressure is held constant during the hold mode by closing both the apply valves and the dump valves.

To achieve maximum braking forces while maintaining vehicle stability, it is desirable to achieve optimum slip levels at the wheels of both the front and rear axles. During vehicle deceleration different braking forces are required at the front and rear axles to reach the desired slip levels. Therefore, the brake pressures should be proportioned between the front and rear brakes to achieve the highest braking forces at each axle. ABS systems with such ability, known as Dynamic Rear Proportioning (DRP) systems, use the ABS valves to separately control the braking pressures on the front and rear wheels to dynamically achieve optimum braking performance at the front and rear axles under the then current conditions.

A further development in braking technology has led to the introduction of Traction Control (TC) systems. Typically, valves have been added to existing ABS systems to provide a brake system which controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, pressurized brake fluid is made available to the wheel cylinders even if the master cylinder is not actuated by the driver.

During vehicle motion such as cornering, dynamic forces are generated which can reduce vehicle stability. A Vehicle Stability Control (VSC) brake system improves the stability of the vehicle by counteracting these forces through selective brake actuation. These forces and other vehicle parameters are detected by sensors which signal an electronic control unit. The electronic control unit automatically operates pressure control devices to regulate the amount of hydraulic pressure applied to specific individual wheel brakes. In order to achieve optimal vehicle stability, braking pressures greater than the master cylinder pressure must quickly be available at all times.

SUMMARY OF THE INVENTION

This invention relates to an improved vehicle braking system. The vehicle braking system includes a master cylinder for generating pressurized fluid. A wheel brake is in fluid communication with the master cylinder. The brake system further includes a first valve for regulating the flow of fluid between the master cylinder and the wheel brake. The brake system also includes a pedal travel simulator including a housing having a bore formed therein. A piston is slidably disposed in the bore. The piston and the housing generally defining a fluid chamber which is in fluid communication with the master cylinder. The pedal travel simulator further includes a spring which biases the piston in a direction so as to contract the fluid chamber. The brake system further includes a source of pressurized fluid, such as a pump and high pressure accumulator. A boost valve can be located remotely from the master cylinder. The boost valve is in fluid communication with the source of pressurized fluid and the wheel brake. The boost valve is preferably mechanically actuated by the spring of the pedal travel simulator to supply pressurized fluid from the source of pressurized fluid to the wheel brake at a pressure ratio greater than fluid pressure generated by the master cylinder.

In a specific embodiment of a boost valve, in accordance with the present invention, the boost valve includes a valve body having first and second valve chambers. A sleeve member is fixed relative to the valve body. The sleeve member has a first end having a bore formed therein. A poppet valve assembly is movable relative to the sleeve member between a first position and a second position. The poppet valve has first and second ends. The boost valve further include a first valve member defined by the first end of the poppet valve assembly and the cooperation of the second end of a reaction spool engaged with a spring of a pedal travel simulator. A second valve member is defined by the cooperation of the first end of the sleeve member and the second end of the poppet valve assembly. When the poppet valve assembly is in its first position, the first valve member allows the flow of fluid between the bore of the reaction spool and the first valve chamber, and the second valve member restricts the flow of fluid between the second valve chamber and the source of pressurized fluid. When the poppet valve assembly is in its second position, the first valve member restricts the flow of fluid between the bore of the reaction spool and the first valve chamber, and the second valve member allows the flow of fluid between the second valve chamber and the source of pressurized fluid.

Various objects and advantages of this invention will become apparent to those skilled in the art from the following detailed description of the preferred embodiments, when read in light of the accompanying drawings.

BRIEF DESCRIPTION OF THE DRAWINGS

FIG. 4 is a sectional view of the sleeve of the boost valve illustrated in FIGS. 2 and 3.

FIG. 5 is a front elevational view of the sleeve viewed along the line of 5—5 in FIG. 4.

FIG. 6 is a sectional view of a cylindrical disc of the boost valve illustrated in FIGS. 2 and 3.

FIG. 7 is a front elevational view of the cylindrical disk viewed along the line 7—7 of FIG. 6.

DETAILED DESCRIPTION OF THE INVENTION

Figure 1:
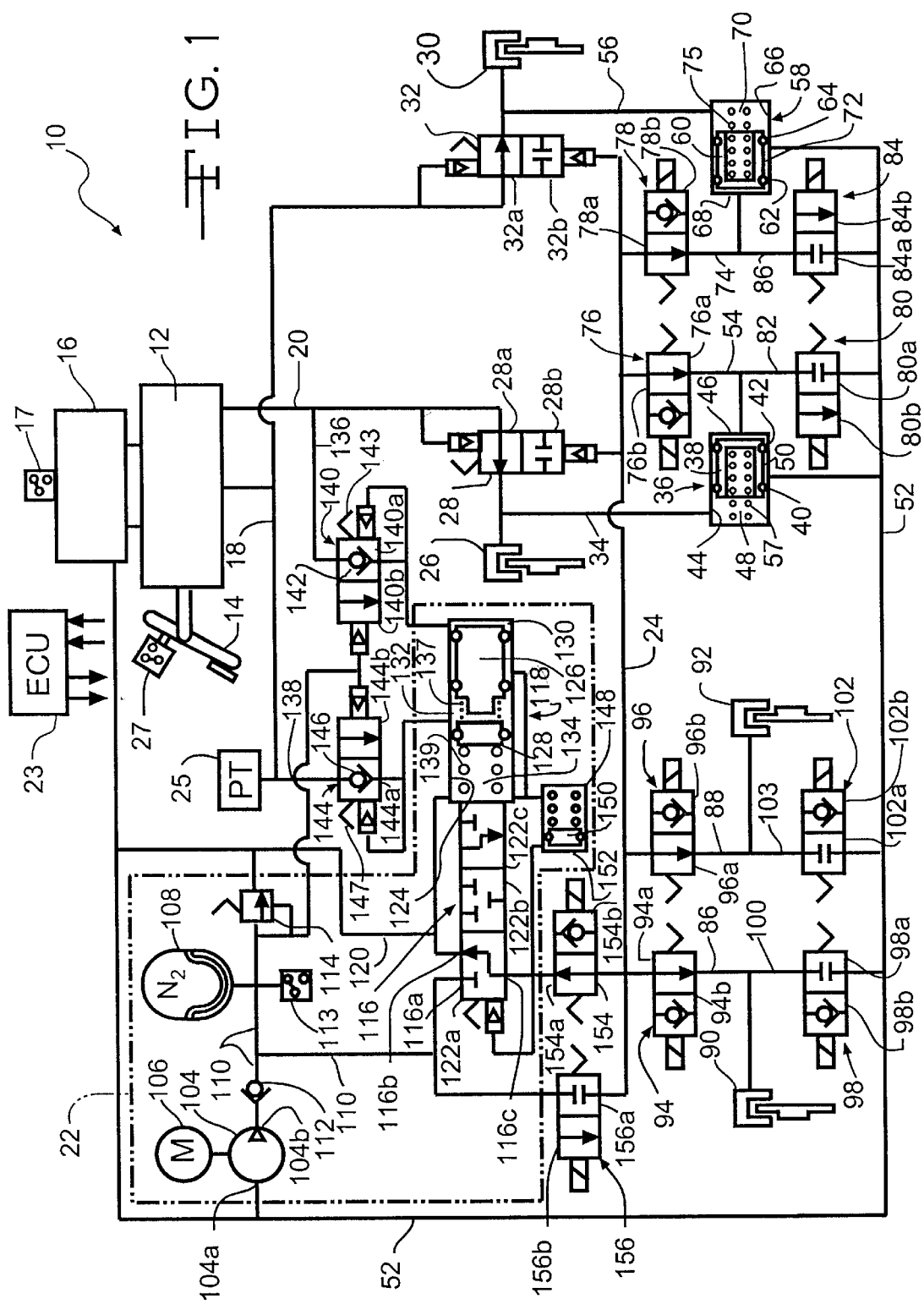
FIG. 1 is a hydraulic schematic of a first embodiment of a brake system, in accordance with the present invention.

In the following description of the invention, certain terminology will be used for the purpose of reference only, and are not intended to be limiting. Terms such as "upper", "lower", "above", "below", "rightward", "leftward", "clockwise", and "counterclockwise" refer to directions in the drawings to which reference is made. Terms such as "inward" and "outward" refer to directions toward and away from, respectively, the geometric center of the component described. Terms such as "front", "rear", "side", "right-hand", "left-hand", "top", "bottom", "horizontal", and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

Referring now to the drawings, there is illustrated in FIG. 1 a hydraulic schematic of a first embodiment of a vehicle brake system, indicated generally at 10, in accordance with the present invention. The brake system 10 includes a master cylinder, such as a tandem master cylinder 12, which is operatively connected to a brake pedal 14. A reservoir 16 is in fluid communication with the master cylinder 12 and holds a supply of brake fluid generally at atmospheric pressure.

Throughout this specification and claims, the term "in fluid communication with" refers to a hydraulic connection between two or more components in which hydraulic pressure is transmittable from one component to another through a fluid medium. The fluid medium may or may not contain a valve regulating the flow of fluid between the components. The components can be in direct fluid communication, wherein hydraulic fluid can directly flow between the components. Alternatively, the components can be indirectly in fluid communication, wherein fluid cannot flow directly between the components, but fluid pressure is transmittable between the components. For example, a fluid conduit extending between two components may include a movable piston slidably disposed therein such that the pressure of the fluid acting on one end of the piston causes the piston to move, thereby transmitting the pressure to the fluid acting on the other end of the piston.

A switch 17 may be connected to the reservoir 16 for sensing the fluid level within the reservoir 16. When the master cylinder 12 is actuated by the depression of the brake pedal 14, the pressurized brake fluid produced by the master cylinder 12 enters the brake system 10 from the master cylinder 12 via a pair of conduits 18 and 20.

The brake system 10 further includes a source of pressurized fluid or fluid pressure generator circuit, indicated by a phantom line 22. The fluid pressure generator circuit 22 provides pressurized fluid to the rest of the brake system 10 via a supply conduit 24 during normal boosted braking to achieve brake boost, as will be explained in detail below. The fluid pressure generator circuit 22 also provides pressurized fluid for brake operation during ABS, TC, and VSC modes. As will be explained in detail below, the fluid pressure generator circuit 22 is in fluid communication with the master cylinder 12 via the conduits 18 and 20.

The fluid pressure generator circuit 22 and various solenoid valves of the brake system 10 (further described below) are controlled by an electronic control unit 23 (ECU) using information from various sensors (not all shown). Preferably, the brake system 10 includes a pressure transducer 25 in fluid communication with the conduit 18 for transmitting pressure information to the ECU 23. Alternatively, the pressure transducer 25 may be located in the conduit 20. The brake system 10 may also include a brake switch 27 connected to the brake pedal 14 to provide a signal that the driver of the vehicle is depressing the brake pedal 14.

The brake system 10 includes a first wheel brake 26 which is in fluid communication with the master cylinder 12 via the conduit 20. A first base brake valve 28 is located in the conduit 20, between the first wheel brake 26 and the master cylinder 12. The first base brake valve 28 is movable between a normally open position 28a and a closed position 28b. Preferably, the first base brake valve 28 is a normally open, pilot operated 2-position, 2-way valve. The positioning of the first base brake valve 28 is regulated by the pressure differential between the conduit 20 and the supply conduit 24. The first base brake valve 28 provides for a "manual push through" to the first wheel brake 26, that is, pressurized fluid from the master cylinder 12 can be sent to the first wheel brake 26 when the first base brake valve 28 is in the open position 28a. However, under normal boosted braking conditions, the first base brake valve 28 is in the closed position 28b and the fluid pressure generator circuit 22 delivers pressurized fluid through the supply conduit 24 to actuate the first wheel brake 26, as will be discussed in detail below.

The brake system 10 further includes a second wheel brake 30 which is in fluid communication with the master cylinder 12 via the conduit 18. A second base brake valve 32 is located in the conduit 18, between the second wheel brake 30 and the master cylinder 12. The second base brake valve 32 is movable between a normally open position 32a and a closed position 32b. Preferably, the second base brake valve 32 is a normally open, pilot operated 2-position, 2-way valve, the operation of which is regulated by the pressure differential between the conduit 18 the supply conduit 24. The second base brake valve 32 provides for a "manual push through" to the wheel brake 30, that is, pressurized fluid from the master cylinder 12 can be sent to the second wheel brake 30 when the second base brake valve 32 is in the open position 32a. Under normal boosted braking conditions, the fluid pressure generator circuit 22 delivers pressurized fluid through the supply conduit 24 to actuate the second wheel brake 30, as will be discussed in detail below.

The brake system 10 further includes a fluid conduit 34 which branches off from the conduit 20 adjacent the first wheel brake 26 and is in fluid communication with the first wheel brake 26 and a first fluid separator assembly 36. The first fluid separator assembly 36 includes a spring-biased piston 38 having a pair of seals 40 and 42 disposed thereabout. The seals 40 and 42 engage a cylindrical wall 44 to sealingly separate first and second chambers 46 and 48, respectively. The second chamber 48 is in fluid communication with the first wheel brake 26 via the conduit 34. An annular space 50 is defined between the seals 40 and 42, the piston 38, and the cylindrical wall 44. The annular space 50 is in fluid communication with the reservoir 16 via a return conduit 52. If desired, the brake system 10 can include a sensor (not shown) for sensing a fluid leak across one or both of the seals 40 and 42. The first fluid separator 36 isolates the fluid in the master cylinder 12 and the first wheel brake 26 from the fluid in the fluid pressure generator circuit 22. The fluid pressure generator circuit 22 provides pressurized fluid to the first chamber 46 via a conduit 54 which is selectively in fluid communication with the supply conduit 24. The first fluid separator 36 includes a spring 57 which urges the piston 38 in a direction to minimize the size of the first chamber 46.

A conduit 56 branches off from the conduit 18 adjacent the second wheel brake 30 and provides fluid communication between the second wheel brake 30 and a second fluid separator assembly 58. The second fluid separator assembly 58 is similar in structure and function as the first fluid separator assembly 36. The second fluid separator assembly 58 includes a spring-biased piston 60 having a pair of seals 62 and 64 disposed thereabout. The seals 62 and 64 engage a cylindrical wall 66 to sealingly separate first and second chambers 68 and 70, respectively. The second chamber 70 is in fluid communication with the second wheel brake 30 via the conduit 56. An annular space 72 is defined between the seals 62 and 64, the piston 60, and the cylindrical wall 66. The annular space 72 is in fluid communication with the reservoir 16 via the return conduit 52. The second fluid separator 58 isolates the fluid in the master cylinder 12 and the second wheel brake 30 from the fluid in the fluid pressure generator circuit 22. The fluid pressure generator circuit 22 provides pressurized fluid to the first chamber 68 of the second fluid separator assembly via a conduit 74 which branches from the supply conduit 24. The second fluid separator 58 includes a spring 75 which urges the piston 60 in a direction to minimize the size of the chamber 68.

A first isolation valve 76 is located in the conduit 54 between the fluid pressure generator circuit 22 and the first chamber 46 of the first fluid separator assembly 36. A second isolation valve 78 is located in the conduit 74 between the fluid pressure generator circuit 22 and the first chamber 68 of the second fluid separator assembly 58. Preferably, the first and second isolation valves 76 and 78 are normally open 2-position, 2-way solenoid operated valves having first, normally open positions 76a and 78a, respectively, and second, one-way positions 76b and 78b, respectively. The one-way positions 76b and 78b restrict fluid from flowing from the fluid pressure generator circuit 22 via the supply conduit 24 to the first and second fluid separator assemblies 36 and 58, respectively, but may permit fluid to flow in the opposite direction.

A first dump valve 80 is located in a conduit 82 which is in fluid communication with the return conduit 52 and the conduit 54. The first dump valve 80 is positioned to control flow to the reservoir 16 from the first chamber 46 of the first fluid separator assembly 36. A second dump valve 84 is located in a conduit 86 which is in fluid communication with the return conduit 52 and the conduit 74. The second dump valve 84 is positioned to control flow between the reservoir 16 and the first chamber 68 of the second fluid separator assembly 58. Preferably, the first and second dump valves 80 and 84 are normally closed 2-position, 2-way solenoid operated valves having first, closed positions 80a and 84a, respectively, and second open positions 80b and 84b, respectively.

A pair of conduits 86 and 88 provide fluid communication between the supply conduit 24 and a third wheel brake 90 and a fourth wheel brake 92, respectively. A third isolation valve 94 is located in the conduit 86 to control fluid flow between the fluid pressure generator circuit 22 to the third wheel brake 90. A fourth isolation valve 96 is located in the conduit 88 to control fluid flow between the fluid pressure generator circuit 22 and the fourth wheel brake 92. Preferably, the third and fourth isolation valves 94 and 96 are normally open 2-position, 2-way solenoid operated valves having first, normally open positions 94a and 96a, respectively, and second, one-way positions 94b and 96b, respectively. The one-way positions 94b and 96b restrict fluid from flowing from the fluid pressure generator circuit 22 via the supply conduit 24 to the third and fourth wheel brakes 90 and 92, but allow fluid to flow in the opposite direction.

A third dump valve 98 is located in a conduit 100 which is in fluid communication with the return conduit 52 and the conduit 86. The third dump valve 98 controls the flow of fluid between the reservoir 16 and the third wheel brake 90. A fourth dump valve 102 is located in a conduit 103 which is in fluid communication with the return conduit 52 and the conduit 88. The fourth dump valve 102 controls the flow of fluid between the reservoir 16 and the fourth wheel brake 92. Preferably, the first and fourth dump valves 98 and 102 are normally closed 2-position, 2-way solenoid operated valves having first, closed positions 98a and 102a, respectively, and second, open positions 98b and 102b, respectively.

Preferably, the first and second wheel brakes 26 and 30 are associated with the front wheels of the vehicle in which the brake system 10 is installed, and the third and fourth wheel brakes 90 and 92 are associated with the rear wheels. However, the wheel brakes 26, 30, 90, and 92 of the brake system 10 can be connected in any suitable arrangement.

Although the brake system 10 is shown having independent circuits for the wheel brakes 90 and 92, the brake system 10 could be adapted to include a single isolation valve and a single dump valve for the wheel brakes 90 and 92, such as for example, if the wheel brakes 90 and 92 are rear wheel brakes on a front wheel driven vehicle. Alternatively, the brake system 10 could be adapted to include isolation valves, dump valves, and fluid separator assemblies for each of the wheel brakes 90 and 92 similar to that of the wheel brakes 26 and 30 of the embodiment of the brake system 10 shown in FIG. 1. The brake system 10 could also be adapted to include a single isolation valve, a single dump valve, and a single fluid separator assembly to supply both of the wheel brakes 26 and 30.

The fluid pressure generator circuit 22 includes a pump 104 which is driven by a motor 106. The pump 104 has an inlet 104a in fluid communication with the reservoir 16 via the return conduit 52, and an outlet 104b in fluid communication with a conduit 110. The pump 104 operates to draw fluid from the reservoir 16 and supply the fluid at an increase pressure to the conduit 110. A check valve 112 is provided at the outlet 104b to help prevent the flow of fluid from the conduit 110 into the outlet 104b of the pump 104. Preferably, the fluid pressure generator circuit 22 includes a pressure switch 113 in fluid communication with the conduit 110 for sensing the pressure therein. The accumulator 108 is in fluid communication with the pump outlet 104b through the check valve 112. The accumulator 108 can be any suitable accumulator structure. For example, the accumulator 108 can include a diaphragm or metal bellows which is biased by a gas, such as nitrogen, to pressurize the fluid stored in the accumulator 108. Alternatively, the accumulator 108 can include a spring biased piston for pressurizing fluid stored in the accumulator 108. Preferably, the accumulator 108 pressurizes the fluid contained therein at a pressure within the range of from about 2000 p.s.i. to about 3000 p.s.i., but any suitable storage pressures can be used.

A pressure relief valve 114 selectively permits fluid communication between the outlet 104b of the pump 104 and the reservoir 16, via the conduit 110 and the return conduit 52. The pressure relief valve 114 limits the output pressure of the pump 104 by opening at a predetermined pressure to create a return path between the pump outlet 104b and the reservoir 16 at the pump inlet 104a.

The fluid pressure generator circuit 22 further includes a boost valve, indicated generally at 116. As will be described in detail below, the boost valve 116 is preferably mechanically actuated by a pedal travel simulator, indicated generally at 118. Preferably, the boost valve 116 is a 3-position, 3-way valve. The boost valve 116 can have any suitable valve arrangement, such as a poppet or spool valve. The boost valve 116 is generally located between the pump output 104b and the supply conduit 24. The boost valve 116 is also in fluid communication with the master cylinder 12, but it is mechanically decoupled from it. That is, the boost valve 116 is not mechanically connected to the master cylinder 12 or brake pedal 14. Therefore, the boost valve 116 can be located remotely from the master cylinder 12, providing flexibility in positioning the boost valve 116 within the vehicle. The boost valve 116 is connected at a first port 116a to the outlet of the pump 104b via the conduit 110. A second port 116b of the boost valve 116 is connected to the pump inlet 104a and the reservoir 16 via a conduit 120 and the conduit return 52. A third port 116c of the boost valve 116 is selectively in fluid communication with the wheel brakes 26, 30, 90, and 92 via the supply conduit 24.

The boost valve 116 generally has a first position 122a, a second position 122b, and a third position 122c. In the first position 122a, the second port 116b is in fluid communication with the third port 116c. In the second position 122b, all three ports 116a, 116b, and 116c are disconnected from each other. In the third position 122c, the first port 116a is connected to the third port 116c. The operation of the boost valve 116 will be explained in detail below.

The pedal travel simulator 118 is an accumulator which receives brake fluid from the master cylinder 12, as will be explained in detail below. The pedal travel simulator 118 can be designed to provide the driver with a pedal feel that is similar to typical hydraulic braking systems using conventional boosters or any other desirable pedal feel. The pedal travel simulator 118 includes a bore 124 having first and second pistons 126 and 128 slidably disposed therein. The first and second pistons 126 and 128 divide the bore 124 into first, second, and third chambers 130, 132, and 134, respectively. The first chamber 130 is selectively in fluid communication with the master cylinder 12 via a conduit 136 and the conduit 20. The second chamber 132 is defined between the first and second pistons 126 and 128 and is selectively in fluid communication with the master cylinder 12 via a conduit 138 and the conduit 18. The third chamber 134 is in fluid communication with the reservoir 16 via the conduit 120. The pedal travel simulator 118 includes a spring 137 positioned between the first and second pistons 126 and 128. The pedal travel simulator 118 further includes a spring 139 which actuates the boost valve 116, as will be discussed in detail below.

Located in the conduit 136 between the master cylinder 12 and the first chamber 130 of the pedal travel simulator 118 is a first pedal travel simulator valve 140. Preferably, the first pedal travel simulator valve 140 is a normally closed 2-position, 2-way pilot operated valve, however, any suitable valve can be used, such as a solenoid actuated valve. The first pedal travel simulator valve 140 preferably has a first position 140a having a one-way check valve 142 which may allow fluid to flow in a direction from the first chamber 130 of the pedal travel simulator 118 into the conduit 20, but restricts the flow of fluid in the opposite direction. The first pedal travel simulator valve 140 also has a second position 140b which is open. The first pedal travel simulator valve 140 is biased to the first position 140a by a spring 143. The pilot operated first pedal travel simulator valve 140 senses the pressure differential between the chamber 130 of the pedal travel simulator 118 from the master cylinder 12 and the conduit 110 from the high pressure accumulator 108. The first pedal travel simulator valve 140 moves to the second open position 140b when the fluid pressure in the conduit 110 from the high pressure accumulator 108 overcomes the pressure in the first chamber 130 and the force of the spring 143 biasing the first pedal travel simulator valve 140 to the first position 140a. Preferably, the spring 143 biases the first pedal travel simulator valve 140 to the first position 140a when the pressure within the conduit 110 is less than about 650 p.s.i. relative to the pressure within the first chamber 130. Thus, when the first pedal travel simulator valve 140 is in the first position 140a, fluid flowing from the master cylinder 12 is blocked so that the pressurized fluid from the master cylinder 12 will flow into the wheel brake 26.

Located in the conduit 138 between the master cylinder 12 and the second chamber 130 of the pedal travel simulator 118 is a second pedal travel simulator valve 144. Preferably, the second pedal travel simulator valve 144 is a normally closed 2-position, 2-way pilot operated valve, however, any suitable valve can be used, such as a solenoid actuated valve. The second pedal travel simulator valve 144 preferably has a first position 144a having a one-way check valve 146 which may allow fluid to flow in a direction from the second chamber 132 of the pedal travel simulator 118 into the conduit 18, but restricts the flow of fluid in the opposite direction. The second pedal travel simulator valve 144 also has a second position 144b which is open. The second pedal travel simulator valve 144 is biased to the first position 144a by a spring 147. The pilot operated second pedal travel simulator valve 144 senses the pressure differential between the second chamber 132 of the pedal travel simulator 118 from the master cylinder 12 and the conduit 110 from the high pressure accumulator 108. The second pedal travel simulator valve 144 moves to the second open position 144b when the fluid pressure in the conduit 110 from the high pressure accumulator 108 overcomes the pressure in the second chamber 132 and the force of the spring 147 biasing the second pedal travel simulator valve 144 to the first position 144a. Preferably, the spring 147 biases the second pedal travel simulator valve 144 to the first position 144a when the pressure within the conduit 110 is less than about 650 p.s.i. relative to the pressure within the second chamber 132. Thus, when the second pedal travel simulator valve 144 is in the first position 144a, fluid flowing into the second chamber 132 from the master cylinder 12 is blocked so that the pressurized fluid from the master cylinder 12 will flow into the wheel brake 30.

The first and second pedal travel simulator valves 140 and 144 are provided for certain conditions in which there is generally not enough fluid pressure from the high pressure accumulator 108 for proper operation of the boost valve 116. In this condition, the first and second pedal travel simulator valves 140 and 144 will close off fluid communication between the master cylinder 12 and the pedal travel simulator 118, and the first and second base brake valves 28 and 32 will provide for manual push through to the first and second wheel brakes 26 and 30.

Preferably, the brake system 10 further includes a compliance accumulator 148 having a spring biased piston 150 pressurizing a chamber 152. The chamber 152 is in fluid communication with the third port 116c of the boost valve 116. The compliance accumulator 148 generally supplies initial instantaneous flow to the supply conduit 24 until the boost valve 116 can respond with sufficient flow. For example, if the boost valve 116 is designed with an internal dampening system for a valve, such as a poppet valve, to help stabilize the valve, the compliance accumulator can provide sufficient flow to the brake system 10. If desired, the compliance accumulator 148 can be omitted from the brake system 10.

The brake system 10 further includes an override isolation valve 154 which is located between the third port 116c of the boost valve 116 and the supply conduit 24. Preferably, the override isolation valve 154 is a normally open 2-position, 2-way solenoid operated valve. The override isolation valve 154 has a first, normally open position 154a, and a second, one-way position 154b which restricts the flow of fluid in a direction from the supply conduit 24 to the third port 116c of the boost valve 116, but may allow fluid to flow in the opposite direction. The brake system 10 also includes an override dump valve 156 which is located in the conduit 110 between the high pressure accumulator 108 and the supply conduit 24. Preferably, the override dump valve 156 is a normally closed 2-position, 2-way solenoid operated valve. The override dump valve 156 has a first closed position 156a, and a second open position 156b. As will be explained in detail below, the override isolation valve 154 and the override dump valve 156 can be actuated to regulate the flow of pressurized fluid flowing from the conduit 110 into the supply conduit 24 even when the master cylinder 12 is not actuated by the brake pedal 14, such as for example, during a TC event or during various VSC events.

The operation of the brake system 10 shall now be described. During normal boosted braking operation, the driver of the vehicle in which the brake system 10 is installed, will depress the brake pedal 14 to actuate the wheel brake 26, 30, 90 and 92. The term "normal boosted braking" refers to the operation of the brake system 10, wherein the ignition system of the vehicle is on and the brake system 10 has not entered into an ABS, TC, or VSC operation. Movement of the brake pedal 14 moves pistons (not shown) within the master cylinder 12, thereby pressurizing the fluid within the conduits 18 and 20. During operation of the vehicle and based on information from the pressure switch 113, the pump 104 is actuated to supply relatively high fluid pressure to the accumulator 108 and the conduit 110 within a selected pressure range, such as between 2000 and 3000 p.s.i. Generally, the fluid pressure within the conduit 110 will be greater than the fluid pressure within the conduits 18 and 20 even when the master cylinder 12 is actuated. The differential across the first and second pedal travel simulator valves 140 and 144 causes the first and second pedal travel simulator valves 140 and 144 to move to the open positions 140b and 144b, respectively. Thus, the pressurized fluid within the conduits 18 and 20 from the master cylinder flows through the conduits 138 and 136, respectively, to the pedal travel simulator 118. The pressurized fluid from the conduit 138 expands the second chamber 132, thereby advancing the second piston 128 leftward, away from the first piston 126. The movement of the second piston 128 acts to compress the spring 139 against a portion of the boost valve 116, thereby actuating the boost valve 116 to the third position 122c. The pedal travel simulator 118 can be designed to provide the driver with a pedal feel, or a reactionary force acting on the brake pedal 12, which is similar to typical brake systems, or the pedal travel simulator 118 can be designed so as to create any suitable desirable reactionary force.

If the pressures within the conduits 136 and 138 are approximately equal, the first piston 126 may remain relatively stationary. However, during certain conditions, such as a rapid spike apply of the master cylinder 12 or a failed condition of the master cylinder 12, the first piston 126 can move leftward moving the second piston 128 therewith. If desired, the pedal travel simulator 118 and the master cylinder 12 could be designed such that both the first and second pistons 126 and 128 are advanced during a brake apply. Alternatively, the pedal travel simulator 118 could be of a single piston design being in fluid communication with either the conduit 18 or the conduit 20 or both.

In the third position 122c, the boost valve 116 generally allows pressurized fluid from the pump 104 and the high pressure accumulator 108 to flow from the conduit 110 into the supply conduit 24. The fluid pressure generator circuit 22 operates to supply fluid pressure to the supply conduit 24, referred herein as "boost pressure", at a predetermined "boost ratio" in relation to the pressure generated from the master cylinder 12, sensed via the spring 139 of the pedal travel simulator 118. The boost pressure is generally greater than the pressure within the conduits 18 and 20 by a predetermined multiple, which multiple is termed the "boost ratio". For example, if the pressure within the conduits 18 and 20 are at 100 p.s.i.g. and the boost ratio is 6, the boost valve 116 will supply fluid at about 600 p.s.i.g. to the supply conduit 24. The boost valve 116 will shuttle to the second position 122b to close the fluid communication between the conduit 110 and the supply conduit 24 when the pressure of the fluid in the supply conduit 24 is approximately equal to the pressure supplied by the master cylinder 12 multiplied by the boost ratio.

Since the pressure within the conduits 18 and 20 will generally be lower than the pressure within the supply conduit 24, the pilot operated first and second base brake valves 28 and 32 are shuttled to their respective closed positions 28b and 32b, thereby closing direct fluid communication between the conduits 20 and 18 and the wheel brakes 26 30, respectively. With the first and second base brake valves 28 and 32 closed, the fluid pressures at the wheel brakes 26 and 30 can exceed the fluid pressure generated by the master cylinder 12 within the conduits 18 and 20.

During normal boosted braking, the isolation valves 94 and 96 are in their open positions 94a and 96a to permit the flow of fluid from the supply conduit 24 to the wheel brakes 90 and 92. The dump valves 98 and 100 are also typically in their closed position 98a and 102a during normal boosted braking to prevent fluid from entering the return conduit 52 to the reservoir 16. The pressurized fluid in the supply conduit 24 also flows through the open isolation valves 76 and 78 during normal boosted braking and into the first chambers 46 and 68 of the first and second fluid separator assemblies 36 and 58, respectively. The pressurized fluid moves the pistons 38 and 60 in the first and second fluid separator assemblies 36 and 58, respectively, towards the second chambers 48 and 70, thereby pressurizing the fluid therein. The pressurized fluid flows from the second chambers 48 and 70 into the wheel brakes 26 and 30 via the conduits 34 and 56 to brake the vehicle. Note that during normal boosted braking, the dump valves 80 and 84 are typically in their respective closed positions 80a and 84a to prevent fluid from entering the return conduit 52 to the reservoir 16.

Based on information from the pressure switch 113, the ECU 23 may actuate the motor 106 of the pump 104 during normal boosted braking to supply relatively high pressure to the conduit 110 and the high pressure accumulator 108 within a selected pressure range. The boost valve 116 will shuttle between its positions 122a, 122b, and 122c to maintain the pressure in the supply conduit 24 at a pressure which is generally equal to the pressure within the conduits 18 and 20 generated by the master cylinder 12 multiplied by the boost ratio.

When the driver releases the brake pedal 14, the fluid within the second chamber 132 of the pedal travel simulator 118 returns to the master cylinder 12 through the check valve 146 of the second pedal travel simulator valve 144. The boost valve 116 is shuttled to the first position 122a which allows fluid communication between the supply conduit 24 and the conduit 120 to the reservoir 16. The pressurized fluid in the first chambers 46 and 68 of the first and second fluid separator assemblies 36 and 58, respectively, returns to the reservoir 16 by flowing through the conduits 54 and 74, respectively, and then through the supply conduit 24, the boost valve 116, and the conduit 120. As the fluid separator assembly pistons 38 and 60 move towards the first chambers 46 and 68, the fluid pressure in the wheel brakes 26 and 30, respectively, is reduced and the fluid therein returns to the second chambers 48 and 70, respectively. The first and second base brake valves 28 and 32 are shuttled to the open positions 28a and 32a, respectively, as the pressure in the supply conduit 24 generally drops below the pressure supplied by the master cylinder 12. Any residual pressurized fluid in the wheel brakes 26 and 30 flows back to the master cylinder 12 via conduits 20 and 18, respectively. The pressure within the wheel brakes 90 and 92 is reduced, and the fluid therein returns to the reservoir 16 via the conduits 86 and 88, respectively, and then through the supply conduit 24, the boost valve 116, and the conduit 120.

During an ABS event, the brake system 10 admits pressurized fluid into the supply conduit 24 in a similar manner as during normal boosted braking. However, during an ABS braking operation, the ECU 23 controls the isolation valves 76, 78, 94, and 96 and the dump valves 80, 84, 98, and 102 to regulate the pressure to the wheel brakes 26, 30, 90, and 92. For example, if the ECU 23 detects that the wheel corresponding to the wheel brake 26 begins to slip appreciably during braking, an ABS dump mode may be entered into. The pressure at the wheel brake 26 is reduced to allow the wheel to spin back up to vehicle speed. To reduce the pressure at the wheel brake 26, the isolation valve 76 is shuttled to the second, one-way position 76b, such as by actuating the solenoid of the isolation valve 76. When the isolation valve is in the one-way position 76b, fluid in the supply conduit 24 is prevented from reaching the fluid separator assembly 36. The dump valve 80 is shuttled to the open position 80b by actuating the solenoid thereof, thereby allowing the pressurized fluid in the first chamber 46 of the first fluid separator assembly 36 to flow back to the reservoir 16 via the return conduit 52. The brake system 10 may enter into an ABS hold mode to give the wheel time to spin back up to speed. During the ABS hold mode, the pressure at the wheel brake 26 is generally held constant by keeping the isolation valve 76 shuttled to its one-way position 76b and keeping the dump valve 80 in its one-way position 80a.

When the ECU 23 detects that the wheel associated with the wheel brake 26 spins back up to near vehicle speed, an ABS apply mode may be entered into in which pressure is increased at the wheel brake 26. The isolation valve 76 is shuttled to the open position 76a and the dump valve 80 is shuttled (or remaining in) its one-way position 80a. This allows the pressurized fluid in the supply conduit 24 to expand the first chamber 46 of the fluid separator assembly 36. The expansion of the first chamber 41 causes the piston 38 to move to pressurize the fluid in the second chamber 48, thereby supplying pressurized fluid to the wheel brake 26. The brake system 10 may enter the dump, hold, and apply modes several times during a single ABS event.

When a driven wheel begins to slip during acceleration, the brake system 10 may enter into a traction control (TC) mode. The slipping wheel is braked to slow the wheel and regain traction for maximum vehicle acceleration. During a TC mode, the ECU 23 actuates the fluid pressure generator circuit 22 to provide pressurized fluid to the supply conduit 24 and controls the operation of the override isolation valve 154 and the override dump valve 156. The ECU 23 actuates the override isolation valve 154 to its one-way position 154b, thereby preventing flow from the supply conduit 24 to the boost valve 116. The ECU 23 also actuates the override dump valve 156 to its open position 156b, thereby allowing high pressure fluid from the conduit 110 to enter the supply conduit 24. Various ones of the isolation valves 76, 78, 94, and/or 96 and the dump valves 80, 84, 98, and/or 102 are controlled to brake the slipping wheel to regain traction. For example, if the wheel corresponding to the first wheel brake 26 is a driven wheel and slippage is detected, the isolation valves 78, 94, and 96 corresponding to the other wheels are actuated to their one-way closed positions, 78b, 94b, and 96b, respectively, thereby blocking fluid communication from the supply conduit 24 thereto. The isolation valve 76 is pulsed from the one-way position 76b to the open position 76a. The pressurized fluid in the supply conduit 24 expands the first chamber 46 of the first fluid separator assembly 36. The expansion of the first chamber 46 moves the piston 38, thereby pressurizing the fluid in the second chamber 48 to provide pressurized fluid to the first wheel brake 26. A traction control hold mode may be entered to keep the pressure constant at the first wheel brake 26. During traction control hold mode, the isolation valve 76 is shuttled to its one-way position 76b. When the speed of the driven wheel associated with the wheel brake 76 has been reduced to near the vehicle speed, a traction control dump mode may be entered into to reduce the brake pressure at the first wheel brake 26. During a traction control dump mode, the isolation valve 76 is shuttled to (or remains in) the one-way position 76b. The dump valve 80 is then shuttled to its open position 80b. The pressurized fluid in the first chamber 46 can flow out through the dump valve 80 and back to the reservoir 16 via the return conduit 52. After the traction control event has ended, the override dump valve 156 is moved to its closed position 156a and the override isolation valve 154 is moved to its open position 154a allowing the fluid in the supply conduit 24 to return to the reservoir 16 via the conduit 120 and the return conduit 52.

During a VSC event, braking may be required on one or more wheels to improve cornering stability of the vehicle. The driver may or may not be braking at that time, and the braking pressures required may exceed the pressure generated by the master cylinder 12. The brake system 10 is actuated and controls the operation of the override isolation valve 154 and the override dump valve 156 in a similar manner as during a TC event, as described above. The isolation and dump valves corresponding to the wheel brakes which are to be actuated control the wheel brake pressure to achieve the desired braking effect. In the embodiment of the brake system 10 as described above, each wheel brake 26, 30, 90, and 92 can be independently modulated from the others.

The brake system 10 may also be used to provide Dynamic Rear Proportioning (DRP). When the brake system 10 enters into a DRP mode, the braking pressures on the front and rear brakes are separately controlled to achieve greater braking performance at the front and rear axles. For example, the brake system 10 can be configured such that the wheel brakes 26 and 30 are associated with the front wheels, and the wheel brakes 90 and 92 are associated with the rear wheels. The respective isolation and dump valves are regulated to increase or decrease the braking pressure at the wheels of the rear brakes at a different pressure from the front brakes, as required to achieve maximum braking effort with minim wheel slippage. Of course, since the brake system 10 can modulate pressure at any wheel individually, as described with respect to VSC operation above, it is anticipated that a DRP operation can be accomplished in a diagonally split system also.

Figure 2:
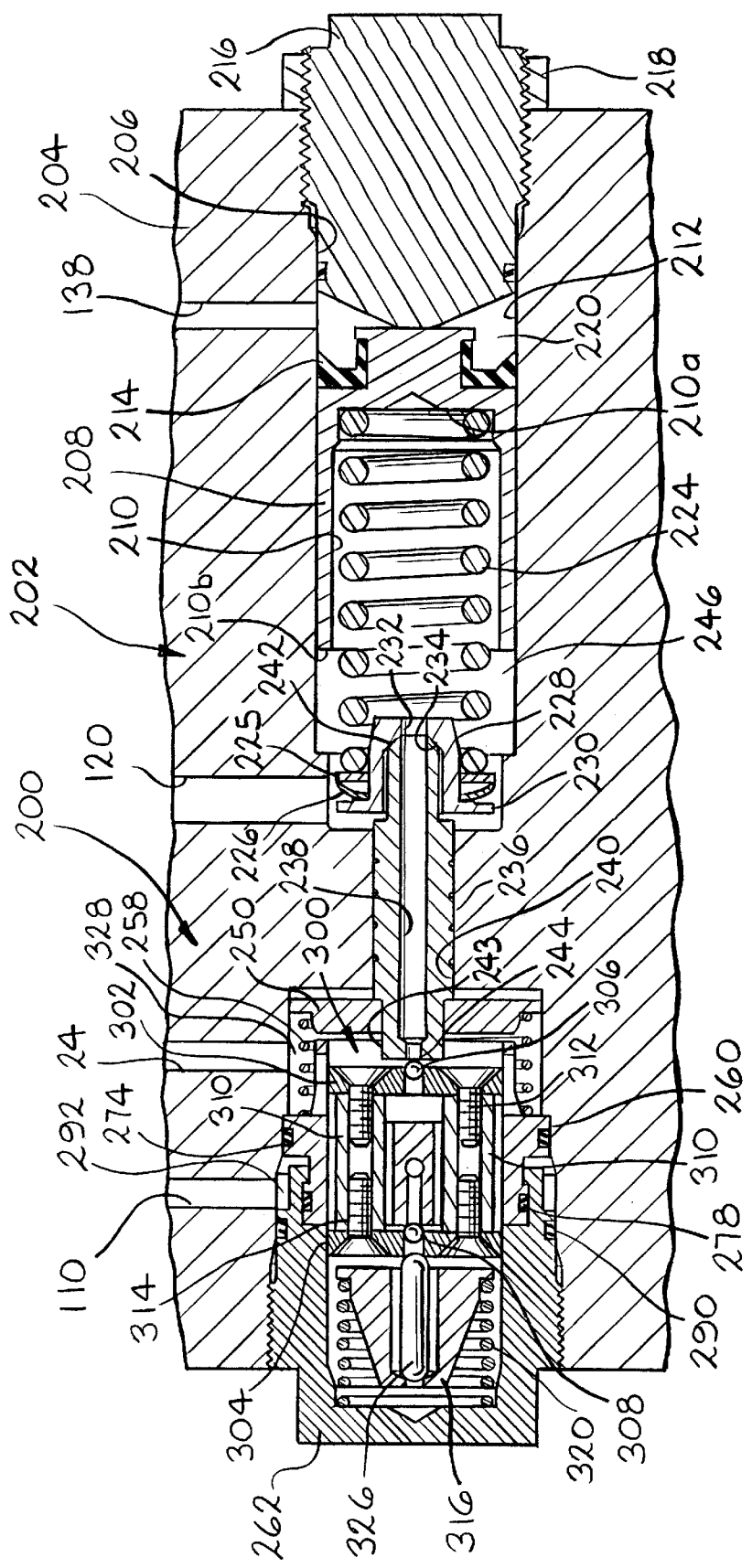
FIG. 2 is a sectional view of a first embodiment of a boost valve and a pedal travel simulator, in accordance with the present invention, which can be used in the brake system illustrated in FIG. 1.

Referring now to FIG. 2, there is shown a first embodiment of a poppet valve design boost valve, indicated generally at 200, which can be used as the boost valve 116 of the brake system 10 illustrated in FIG. 1. The boost valve 200 is mechanically actuated by a pedal travel simulator, indicated generally at 202. Although the pedal travel simulator 202 shown in FIG. 2 is of a single piston configuration, the pedal travel simulator 202 can be adapted to include a second piston so that the pedal travel simulator 202 can be used for the pedal travel simulator 118 of the brake system 10 illustrated in FIG. 1. The boost valve 200 and the pedal travel simulator 202 will generally be described as being adapted to be used in the brake system 10, however it should be understood that the boost valve 200 and the pedal travel simulator 202 can be used with any suitable brake system.

The boost valve 200 and the pedal travel simulator 202 are housed in a valve body 204. The valve body 204 has a stepped cylindrical bore 206 formed therewith defining an axis X. Generally, the components of the boost valve 200 and the pedal travel simulator 202 are co-axially aligned along the axis X.

The pedal travel simulator 202 includes a cup shaped piston 208 having a bore 210 formed therein defining a closed end 210a and an open end 210b of the piston 208. The piston 208 is slidably disposed within a first diameter portion 212 of the stepped bore 206 of the valve body 204. The piston 208 is sealingly engaged with the wall of the first diameter portion 212 by a seal 214 disposed about the closed end of the piston 208. As shown in FIG. 2, the right-hand end of the first diameter portion 212 of the stepped bore 206 is sealingly closed off by a threaded end plug 216. The end plug 216 can be fixably secured to the valve body 204 by any suitable method, such as by a lock nut 218. A first fluid chamber 220 is defined by the closed end of the piston 208, the seal 214, the end plug 216, and the cylindrical wall of the first diameter portion 212. The first fluid chamber 220 is in fluid communication with a control input port, such as the conduit 138 from the master cylinder 12 of the brake system 10 of FIG. 1.

The pedal travel simulator 202 further includes a helical coil spring 224 housed within the bore 210 of the piston 208. The spring 224 biases the piston 208 rightward, as shown in FIG. 2. Preferably, the left-hand end of the spring 224 engages a washer 225 engaging a wave spring 226 (or Belleville washer). Preferably, the wave spring 226 has a non-linear variable spring rate, the reason for which will be explained below. The other end of the wave spring 226 engages a cup-shaped first spring retainer 228. The first spring retainer 228 includes a radially outwardly extending flange 230 which engages the wave spring 226. The first spring retainer 228 has a stepped bore 232 formed therethrough. An annular seat 234 is formed in the wall of the bore 232. The annular seat 234 engages an end of a generally cylindrical reaction spool 236. The reaction spool 236 has a through bore 238 formed therethrough and is slidably disposed within a second diameter portion 240 of the stepped bore 206 of the valve body 204. The reaction spool 236 has a first, rounded end 242 engaging the annular seat 234 of the first spring retainer 228. The reaction spool 236 also has a second end 243 having a valve seat 244 formed therein. The rounded end 242 of the reaction spool 236 cooperates with the annular seat 234 of the first spring retainer 228 to assist in axially aligning the force transmitted between the spring retainer 228 and the reaction spool 236.

A second fluid chamber 246 is generally defined by the open end 210b of the piston 208, the reaction spool 236, and a portion of a cylindrical wall of the first diameter portion 212. The second fluid chamber 246 is in fluid communication with a reservoir port, such as the conduit 120 of the brake system 10 of FIG. 1.

Figure 3:
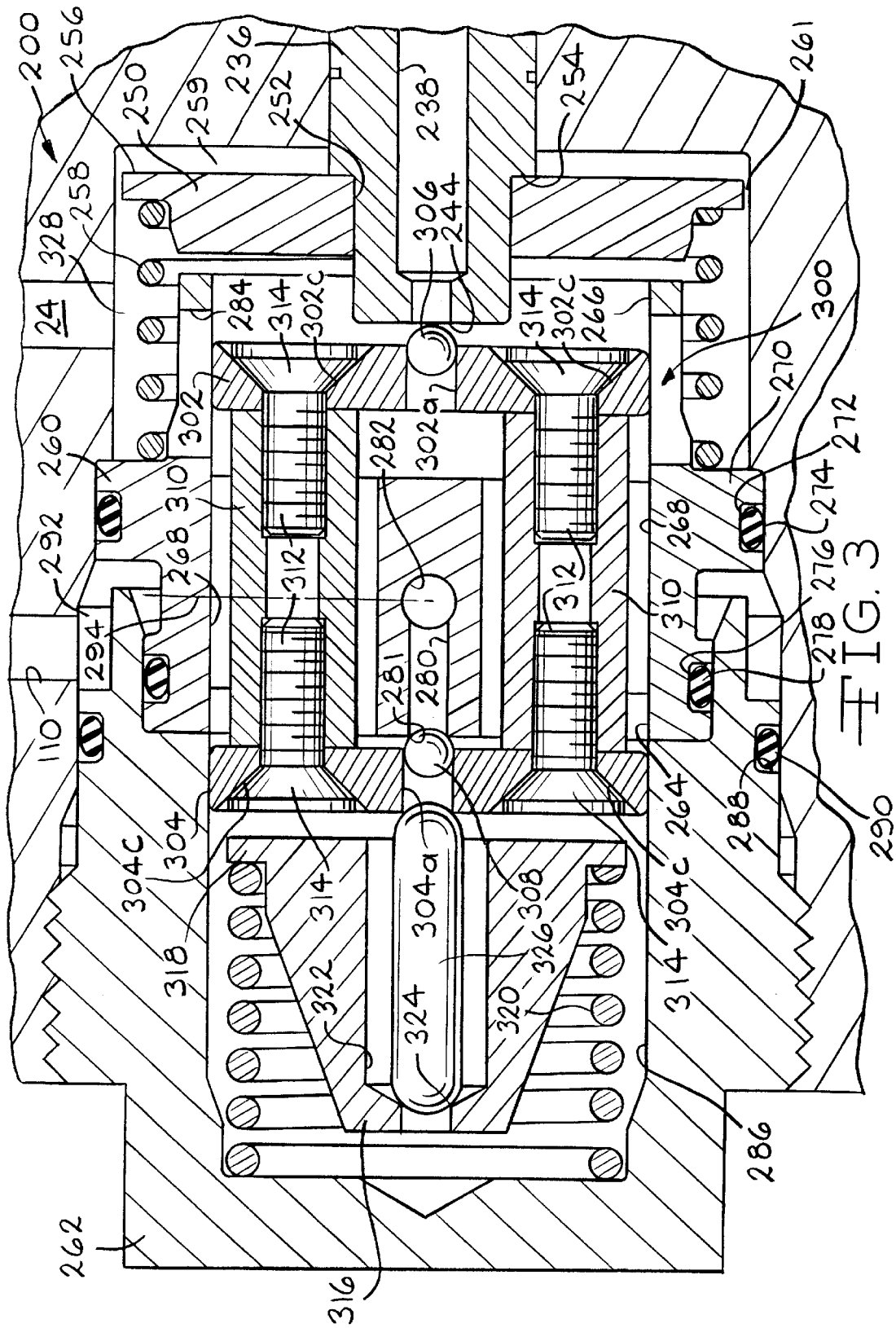
FIG. 3 is an enlarged sectional view of the boost valve illustrated in FIG. 2.

As best shown in FIG. 3, the boost valve 200 includes a cylindrical plate 250 having a bore 252 formed therein. The reaction spool 236 extends through the bore 252. The reaction spool 236 has a shoulder 254 which abuts the right-hand end of the cylinder plate 250, as shown in FIGS. 2 and 3. The cylindrical plate 250 has a radially extending flange 256 which engages a helical spring 258. A damping chamber 259 is defined by the cylindrical plate 250, the reaction spool 236, and the stepped bore 206 of the valve body 204. Fluid can pass through a relatively small area annular gap 261 located between the outer radial surface of the flange 256 and the wall of the bore 206, the reason for which will be explained below. The helical spring 258 engages a wall of a sleeve 260 which is retained in the stepped bore 206 of the valve body 204 by a hollow threaded end cap 262.

As best shown in FIGS. 4 and 5, the sleeve 260 has a first axial bore 264 formed at a first end 260a thereof, and a second axial bore 266 formed at a second end 260b of the sleeve. The sleeve 260 also has a pair of bores 268 formed therethrough extending between the first and second axial bores 264 and 266. The sleeve 260 includes a radially outwardly extending flange 270 having an annular groove 272 formed therein for retaining a seal 274, as shown in FIGS. 2 and 3. The seal 247 sealingly engages the wall of the stepped bore 206 of the valve body 204. The sleeve 260 further includes an annular groove 276 formed adjacent the first end 260a thereof for retaining a seal 278. A relatively small central bore 280 is formed in the first end 260a of the sleeve 260 and forms a valve seat 281. The central bore 280 communicates with a radial bore 282 formed through the sleeve 260. A plurality of radial openings 284 are formed through a wall of the sleeve 260 adjacent the second end 260b thereof. The radial openings 284 communicate with the second axial bore 266.

As shown in FIGS. 2 and 3, the hollow end cap 262 is threadably engaged with the wall of the stepped bore 206 of the valve body 204 and closes off the left-hand end thereof. The end cap 262 has a stepped bore 286 formed therein. The seal 278 disposed about the sleeve 260 is sealingly engaged with the wall of the stepped bore 286. An annular groove 288 is formed in the outer wall of the end cap 262 for retaining a seal 290 which sealingly engages with the wall of the stepped bore 206 of the valve body 204. A third chamber 292 is generally defined by the seals 274, 278, and 290, the sleeve 260, the end cap 262, and the wall of the stepped bore 206. The third chamber 292 is in fluid communication with a high pressure input port, such as the conduit 110 of the brake system 10 of FIG. 1. The third chamber 292 is in fluid communication with the radial bore 282 of the sleeve 260, as indicated by the phantom lines 294 extending therebetween, as shown in FIG. 3.

As best shown in FIG. 3, the boost valve 200 further includes a valve assembly, generally indicated at 300, which is generally positioned within the sleeve 260 for limited axial movement. The valve assembly 300 includes first and second cylindrical discs 302 and 304, which are axially spaced apart from each other. The first and second cylindrical discs 302 and 304 are similar in construction, and can be manufactured as the same component but with different orientations when installed in the boost valve 200. The first cylindrical disc 302 is shown in detail in FIGS. 6 and 7, and similar suffix designation letters will be used for features common between the first and second cylindrical discs 302 an 304. The first cylindrical disc 302 includes an axial bore 302a extending therethrough. As shown in FIG. 7, a pair of openings 302b are formed through the first cylindrical disc 302. The openings 302b are spaced apart from each other generally across the axial bore 302a. As will be discussed below, the openings 302b assist in fluid communication through the first and second cylindrical discs 302 and 304. A pair of tapered holes 302c are formed through the first cylindrical disc 302. The tapered holes 302c are spaced apart from each other generally across the axial bore 302a.

As best shown in FIG. 3, a ball 306 is press fit into the axial bore 302a of the first cylindrical disc 302. The ball 306 cooperates with the valve seat 244 formed in the reaction spool 236 to form a valve member for regulating the flow of fluid through the bore 238 of the reaction spool 236. A ball 308 is press fit into the axial bore 304a of the second cylindrical disc 304. The ball 308 cooperates with the valve seat 281 formed in the first end 260a of the sleeve 260 to form a valve member for regulating the flow of fluid from the third chamber 292 via the radial bore 282 and central bore 280 formed in the sleeve 260.

The valve assembly 300 further includes a pair of tubular spacers 310 positioned between the first and second cylindrical discs 302 and 304. The tubular spacers 310 and the first and second cylindrical discs 302 and 304 are fastened together by four bolts 312. The bolts 312 have tapered heads 314 which are received in the tapered holes 302c and 304c of the first and second cylindrical discs 302 and 304. The tubular spacers 310 extend through the pair of bores 268 of the sleeve 260, thereby allowing axial movement of the valve assembly 300 with respect to the sleeve 260.

The boost valve 200 further includes a cup-shaped second spring retainer 316 positioned within the bore 286 of the end cap 262. The second spring retainer 316 includes a radially extending flange 318 engaging one end of a spring 320. The other end of the spring 320 engages an end wall of the bore 286 of the end cap 262. The second spring retainer 316 has a stepped bore 322 formed therethrough. An annular seat 324 is formed in the wall of the bore 322 which engages a rounded end of a pin 326. The other end of the pin 326 is also rounded and engages the second cylindrical disc 304. The spring 320, the second spring retainer 316, and the pin 326 cooperate to bias the valve assembly 300 rightward, as shown in FIGS. 2 and 3, such that the spring force transmitted is generally axially aligned along the axis X to assist in seating the ball 308 against the seat 281.

A fourth chamber 328 is generally defined by the end cap 262, the sleeve 260, the reaction spool 236, and the stepped bore 206 of the valve body 204. The fourth chamber 328 is in fluid communication with a boost output port, such as the supply conduit 24 of the brake system 10 of FIG. 1. Generally, the valve assembly 300 is submersed within the fourth chamber 328.

The operation of the boost valve 200 and the pedal travel simulator 202 shall now be described as being adapted for use in the brake system 10 of FIG. 1. A stated earlier, the embodiment of the pedal travel simulator 202 can be adapted to be of a dual piston design, such as the pedal travel simulator 118 of the brake system 10 of FIG. 1. For the purposes of explanation, the first fluid chamber 220 of the pedal travel simulator 202 will be described as being connected to the brake system 10, in a similar manner as the second chamber 132 of the pedal travel simulator 118 is in fluid communication with the conduit 138. Normally, when the driver of the vehicle has depressed the brake pedal 14 and the brake system 10 has not entered into an ABS, TC, DRP, or VSC brake operation, the boost valve 200 is in the position as illustrated in FIGS. 2 and 3, which is similar to the first position 122a such that the conduit 120 is in fluid communication with the supply conduit 24. In this position, the ball 306 is unseated from the valve seat 244 of the reaction spool 236, thereby allowing fluid communication between the second fluid chamber 246 to the fourth fluid chamber 328 via the bore 238 of the reaction spool 236. The ball 308 is seated on the valve seat 281 of the sleeve 260, thereby closing fluid communication between the third and fourth fluid chambers 292 and 328.

When the driver depresses the brake pedal 14 for normal boosted braking, the master cylinder 12 pressurizes the brake fluid in the conduit 18 which flows into the first fluid chamber 220. The first fluid chamber 220 expands, thereby causing the piston 208 to move leftward, as viewing FIG. 2. The movement of the piston 208 exerts a force on the spring 224 and the wave spring 226 which is transmitted through the first spring retainer 228 to the reaction spool 236. Preferably, the wave spring 226 has a non-linear variable spring rate so that as the wave spring 226 compresses, its spring rate increases until it matches the generally constant spring rate of the spring 224. The compression of the wave spring 226 and the spring 224 can provide for a smooth brake pedal feel or response similar to a typical hydraulic braking system having a conventional booster. The force acting on the reaction spool 236 causes the reaction spool 236 to move leftward, as viewing FIG. 2.

The movement of the reaction spool 236 causes the cylindrical plate 250 to move left-ward, as viewing FIGS. 2 and 3, against the bias of the spring 258. As the cylindrical plate 250 moves leftward, the damping chamber 259 expands. Fluid enters the damping chamber 259 via the annular gap 261. The annular gap 261 and the damping chamber 259 cooperate to assist in dampening hydraulic pulses traveling through the fluid within the boost valve 200. The movement of the reaction spool 236 causes the ball 306 to seat on the valve seat 244, thereby closing fluid communication between the second fluid chamber 246 and the fourth fluid chamber 328. Further movement of the reaction spool 236 pushes against the valve assembly 300 causing the valve assembly to move leftward, as viewing FIGS. 2 and 3. Movement of the valve assembly 300 causes the ball 308 to unseat from the valve seat 281 formed on the sleeve 206. The boost valve 200 is now in a position similar to the third position 122c of the boost valve 116 of the FIG. 1. Thus, the pressurized fluid from the fluid pressure generator circuit 22 is allowed to flow into the fourth fluid chamber 328 via the conduit 294, the third fluid chamber 292, the radial bore 282, and the central bore 280. The pressurized fluid flows around the valve assembly 300 through the radial openings 284 of the sleeve 260 and out through the supply conduit 24. The valve assembly 300 is moved back to the right when the pressure within the fourth fluid chamber 328 rises above the pressure from the master cylinder 12 multiplied by the predetermined boost ratio. The boost ratio is determined by the relative swept areas of the first and second diameter portions 212 and 240 of the stepped bore 206 of the valve body 204. Typically, the boost valve 200 will eventually reach an equilibrium, wherein the balls 306 and 308 are seated on the valve seats 244 and 282, respectively, and will stay in a position similar to the second position 122b of the boost valve 116 of FIG. 1. When the pressure generated from the master cylinder 12, such as by changing the position of the brake pedal 14, the boost valve 200 will operate as described above to maintain a pressure in the supply conduit 24 at a factor above the pressure generated by the master cylinder 12 as determined by the boost ratio. When the driver releases the brake pedal 14, the piston 208 will move rightward until stopped by the end plug 216. The boost valve 200 will then return to the position, as illustrated in FIGS. 2 and 3.

Figure 8:
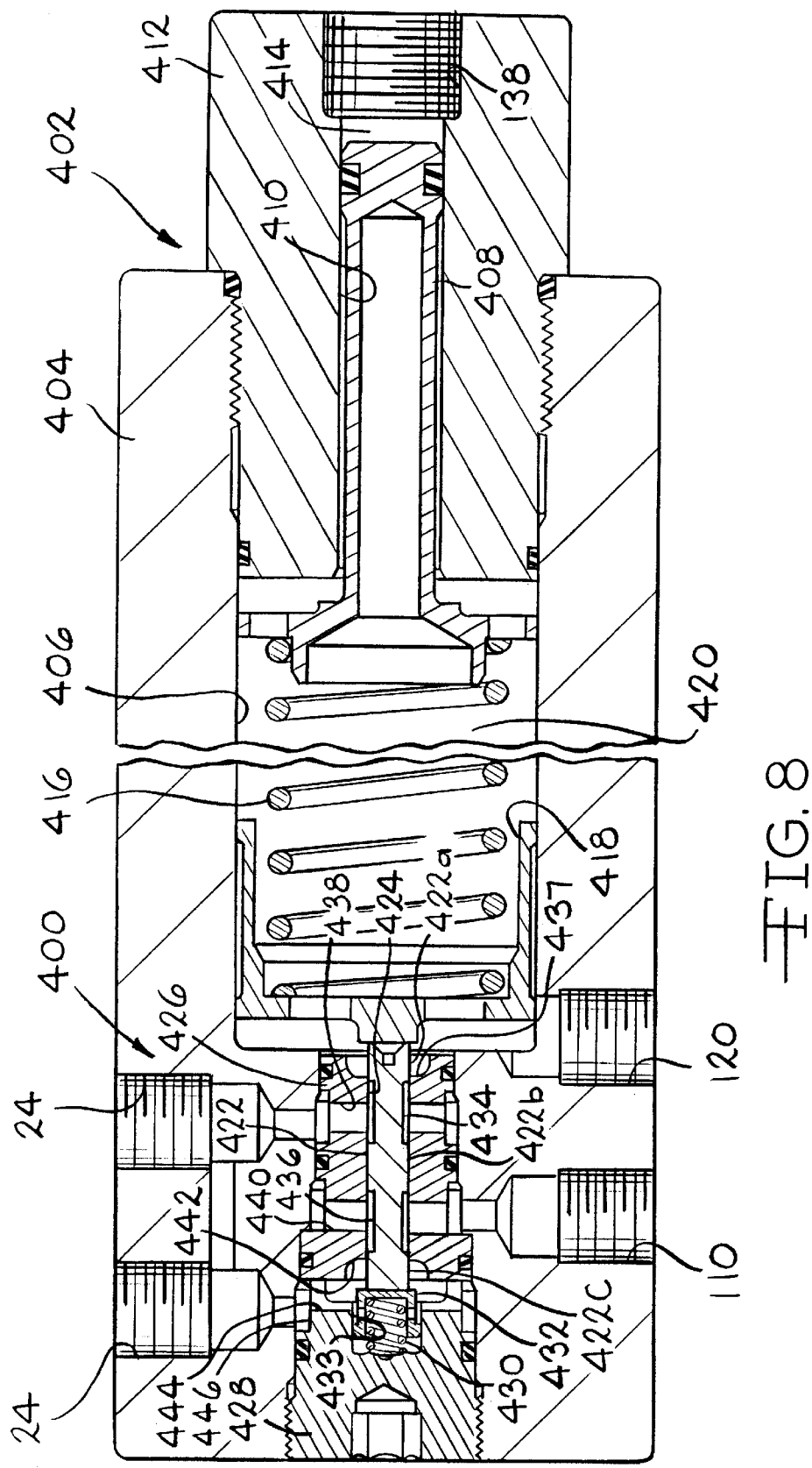
FIG. 8 is a sectional view of a second embodiment of a boost valve and a pedal travel simulator, in accordance with the present invention.

Referring now to FIG. 8, there is shown a second embodiment of a boost valve, indicated generally at 400. The boost valve 400 is of a spool valve design and can be used for the boost valve 116 of the brake system 10 illustrated in FIG. 1. The boost valve 400 is mechanically actuated by a pedal travel simulator, indicated generally at 402. The pedal travel simulator 402 is of a single piston configuration, but can be adapted to include a second piston so that the pedal travel simulator 402, for example, to be used as the pedal travel simulator 118 of the brake system 10 illustrated in FIG. 1. The boost valve 400 and the pedal travel simulator 402 will be described as being adapted to be used in the brake system 10, however, it should be understood that the boost valve 400 and the pedal travel simulator 402 can be used with any suitable brake system.

The boost valve 400 and the pedal travel simulator 402 are housed in a valve body 404 having a stepped bore 406 formed therein. The pedal travel simulator 402 includes an elongated piston 408 slidably disposed within a bore 410 of an end cap 412. The end cap 412 closes off one end of the stepped bore 406 of the valve body 404. The right-hand end of the piston 408 and the bore 410 of the end cap 412 generally define a first fluid chamber 414 which is in communication with a control input port, such as the conduit 138 from the master cylinder 12 of the brake system 10 of FIG. 1. The pedal travel simulator 402 further includes a helical spring 416 acting on the piston 408 and a cup shaped first spring retainer 418. A second fluid chamber 420 is generally defined by the left-hand end of the end cap 412 and a portion of the stepped bore 406 of the valve body 404. The second fluid chamber 420 is in fluid communication with a reservoir port, such as the conduit 120 of the brake system 10 of FIG. 1 via a plurality of openings 418a formed in the first spring retainer 418.

The first spring retainer 418 engages an end of a spool 422 slidably disposed within a bore 424 of a sleeve 426. The sleeve 426 is retained in the stepped bore 406 by an end plug 428. The spool 422 is biased rightward by a spring 430 and a second spring retainer 432 housed within a bore 433 of the end plug 428. The spool 422 is biased leftward, as viewing FIG. 8, by the spring 416 and the first spring retainer 418. The spool 422 has first, second, and third lands 422a, 422b, and 422c, respectively. A first spool chamber 434 is defined between the first land 422a, the second land 422b, and the bore 424 of the sleeve 426. A second spool chamber 436 is defined between the second land 422b, the third land 422c, and the bore 424 of the sleeve 426.

The sleeve 426 has a first end cavity 437 in fluid communication with the second chamber 420 which is in fluid communication with the conduit 120. The sleeve 426 further has a first radial passageway 438 extending through the bore 424. The first radial passageway 438 is in fluid communication with a boost output port, such as the supply conduit 24 of the brake system 10 of FIG. 1. The sleeve 426 has a second radial passageway 440 through the bore 424. The second radial passageway 440 is in fluid communication with a high pressure input port, such as the conduit 110 of the brake system 10 of FIG. 1. The sleeve 426 has a second end cavity 442 formed in the left-hand end of the sleeve 426, as shown in FIG. 8. The end plug 428 has an end cavity 444 in communication with a plurality of radial passages 446 formed therein. The end cavity 442 of the sleeve 426, the end cavity 444 of the end plug 428, and the radial passages 446 of the end plug 426 are in fluid communication with a boost output port, such as the supply conduit 24 of the brake system 10 of FIG. 1.

The operation of the boost valve 400 and the pedal travel simulator 402 shall now be described as being adapted for use in the brake system 10 of FIG. 1. However, it should be understood that the boost valve 400 and the pedal travel simulator 402 can be used in any suitable brake system. Normally, when the master cylinder 12 is not generating pressurized fluid, the first land 422a does not cover the end cavity 437 of the sleeve 426, thereby permitting the flow of fluid from the supply conduit 24 to the conduit 120 via the first radial passageway 438, the first spool chamber 434, and the end cavity 437. In this position, the boost valve 400 is in a position similar to the position 122a of the boost valve 116 of the brake system 10 of FIG. 1. The openings 418a of the first spring retainer 418 could be formed as orifices to provide for dampening of hydraulic pulses to stabilize the spool 422.

When the driver of the vehicle depresses the brake pedal 14, the master cylinder 12 pressurizes the brake fluid in the conduit 138, thereby expanding the first fluid chamber 414. The expansion of the first fluid chamber 414 causes the piston 408 to move leftward, as viewing FIG. 8. The piston 408 exerts a force on the spring 416 which is transmitted through the first spring retainer 418 to the spool 422. The spool 422 is moved leftward such that the first land 422a covers the first end cavity 437, thereby blocking fluid communication between the supply conduit 24 and the conduit 120. The movement of the spool 422 causes the third land 422c to move past the second end cavity 442, thereby permitting the flow of fluid between the conduit 110 and the supply conduit 24 via the radial passages 446, the end cavity 444, the second end cavity 442, the second spool chamber 436, and the second radial passageway 440. The boost valve 400 is now in a position similar to the position 122c of the boost valve 116 of FIG. 1. The spool 422 is moved back to the right when the fluid pressure in the second end cavity 442 and the end cavity 444 is greater than the pressure from the master cylinder 12 multiplied by the predetermined boost ratio. The boost ratio is determined by the relative swept areas of the bore 410 of the end cap 412 and the bore 424 of the sleeve 426. Typically, the boost valve 400 will eventually reach equilibrium and the boost valve will stay in a position similar to the position 122b of the boost valve 116 maintaining the pressure in the supply conduit 24 at a factor above the pressure generated by the master cylinder 12 as determined by the boost ratio.

Figure 9:
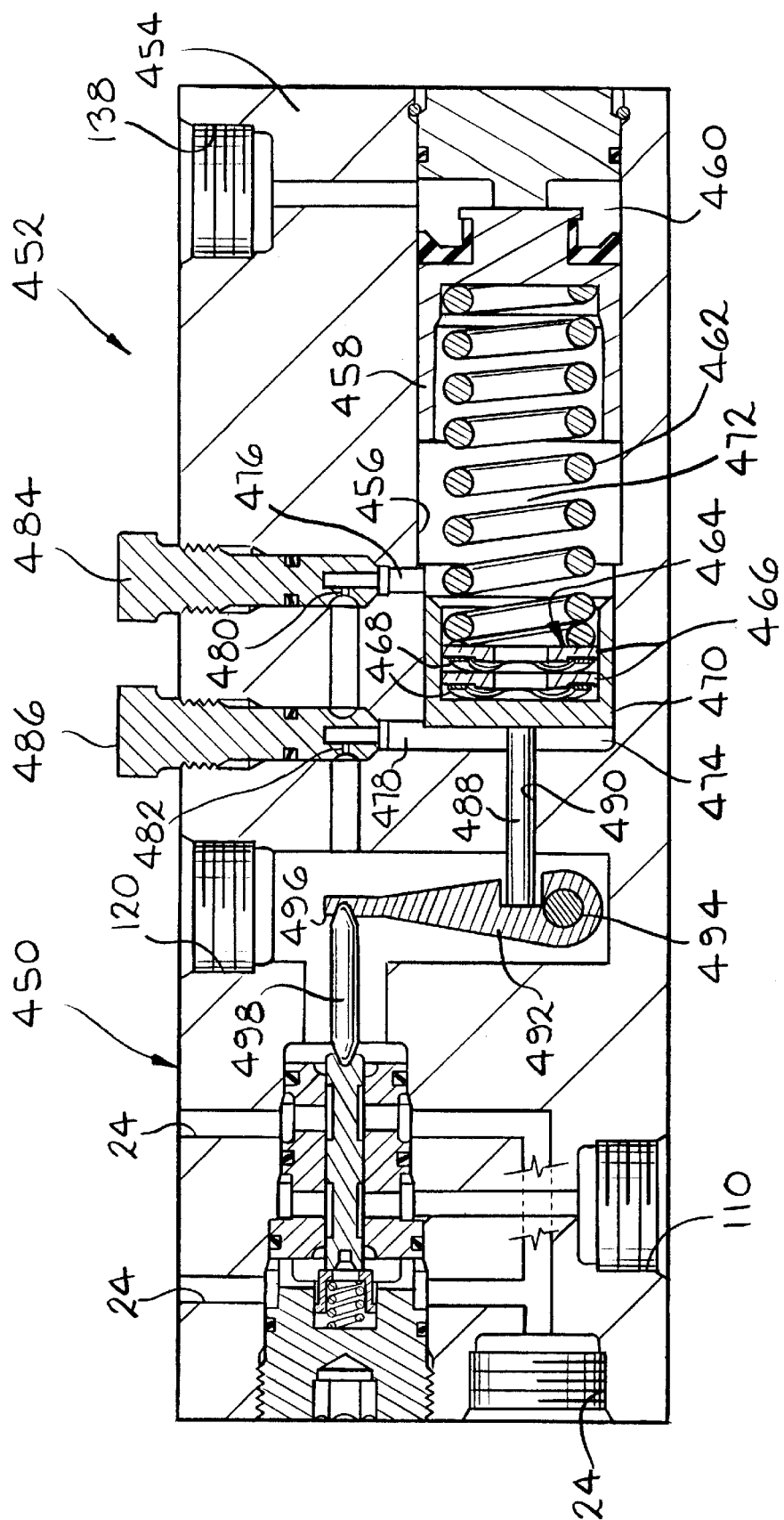
FIG. 9 is a sectional view of a third embodiment of a boost valve and a pedal travel simulator, in accordance with the present invention.

Referring now to FIG. 9, there is shown a third embodiment of a boost valve, indicated generally at 450, which can be used for the boost valve 116 of the brake system 10 illustrated in FIG. 1. The boost valve 450 is similar in structure and function as the boost valve 400 illustrated in FIG. 8. The boost valve 450 is mechanically actuated by a pedal travel simulator, indicated generally at 452. The pedal travel simulator 452 is of a single piston configuration, but can be adapted to include a second piston so that the pedal travel simulator 452 can be used for the pedal travel simulator 118 of the brake system 10 illustrated in FIG. 1. The boost valve 450 and the pedal travel simulator 452 will be described as being adapted to be used in the brake system 10, however it should be understood that the boost valve 450 and the pedal travel simulator 452 can be used with any suitable brake system.

The pedal travel simulator 452 is housed in a valve body 454 having a first bore 456 formed therein. The pedal travel simulator 452 includes a piston 458 slidably disposed within the stepped bore 456 closing off one end of the stepped bore 456. The right-hand end of the piston 458 and the stepped bore 456 define a first fluid chamber 460 which is in communication with a control input port, such as the conduit 138 from the master cylinder 12 of the brake system 10 of FIG. 1. The pedal travel simulator 452 further includes a helical spring 462 acting on one end of the piston 458. The other end of the spring 462 acts against a wave spring assembly 464 having a pair of washers 466 and a pair of wave springs 468. The wave spring assembly 464 is housed within a cup shaped spring retainer 470. Preferably, the spring retainer 470 is disposed within the first bore 456 by a relatively tight radial fit. A second fluid chamber 472 is generally defined by the piston 458, the first bore 456 of the valve body 454, and the right-hand end of the spring retainer 470. A third fluid chamber 474 is defined by the first bore 456 and the left-hand end of the spring retainer 470. The second fluid chamber 472 is in fluid communication with a passageway 476 formed through the valve body 454. The third fluid chamber 474 is in fluid communication with a passageway 478 formed through the valve body 454. The passageways 476 and 478 preferably have a pair of orifices 480 and 482, respectively, located therein, formed in plugs 484 and 480, respectively. The orifices 476 and 478 and the second and third fluid chambers 472 and 474 cooperate to provide for dampening of hydraulic pulses to stabilize the spool valve 450. The passageways 476 and 478 are in fluid communication with a reservoir port, such as the conduit 120 of the brake system 10 of FIG. 1.

The spring retainer 470 engages an end of a first pin 488. Preferably, the pin 488 is disposed within a bore 490 formed through the valve body 454 by a relatively tight radial fit. The other end of the first pin 488 engages a lever 492 pivotable about a pivot point 494. An end 496 of the lever 492 engages an end of a second pin 498. The other end of the second pin 498 engages the spool of the boost valve 450.

The operation of the boost valve 450 and the pedal travel simulator 452 shall now be described as being adapted for use in the brake system 10 of FIG. 1. However, it should be understood that the boost valve 450 and the pedal travel simulator 452 can be used in any suitable brake system. When the driver of the vehicle depresses the brake pedal 14, the master cylinder 12 pressurizes the brake fluid in the conduit 138, thereby expanding the first fluid chamber 460. The expansion of the first fluid chamber 460 causes the piston 458 to move leftward, as viewing FIG. 9. The piston 458 exerts a force on the spring 462 which is transmitted through the wave spring assemblies 464 to the spring retainer 470. The movement of the spring retainer 470 causes the first pin 488 to move leftward causing a rotation of the lever 492 in a counter-clockwise direction, as viewing FIG. 9. The rotation of the lever 492 imparts leftward longitudinal movement on the second pin 498. Movement of the second pin 498 actuates the spool of the boost valve 450 which operates in a similar manner as the boost valve 400 illustrated in FIG. 8.

The boost ratio of the boost valve 450 is determined by the relative areas of the spool of the boost valve 450, the relative area of the piston 458, and the mechanical advantage created by the leverage of the interaction of the first pin 488, the lever 492, and the second pin 498.

Figure 10:
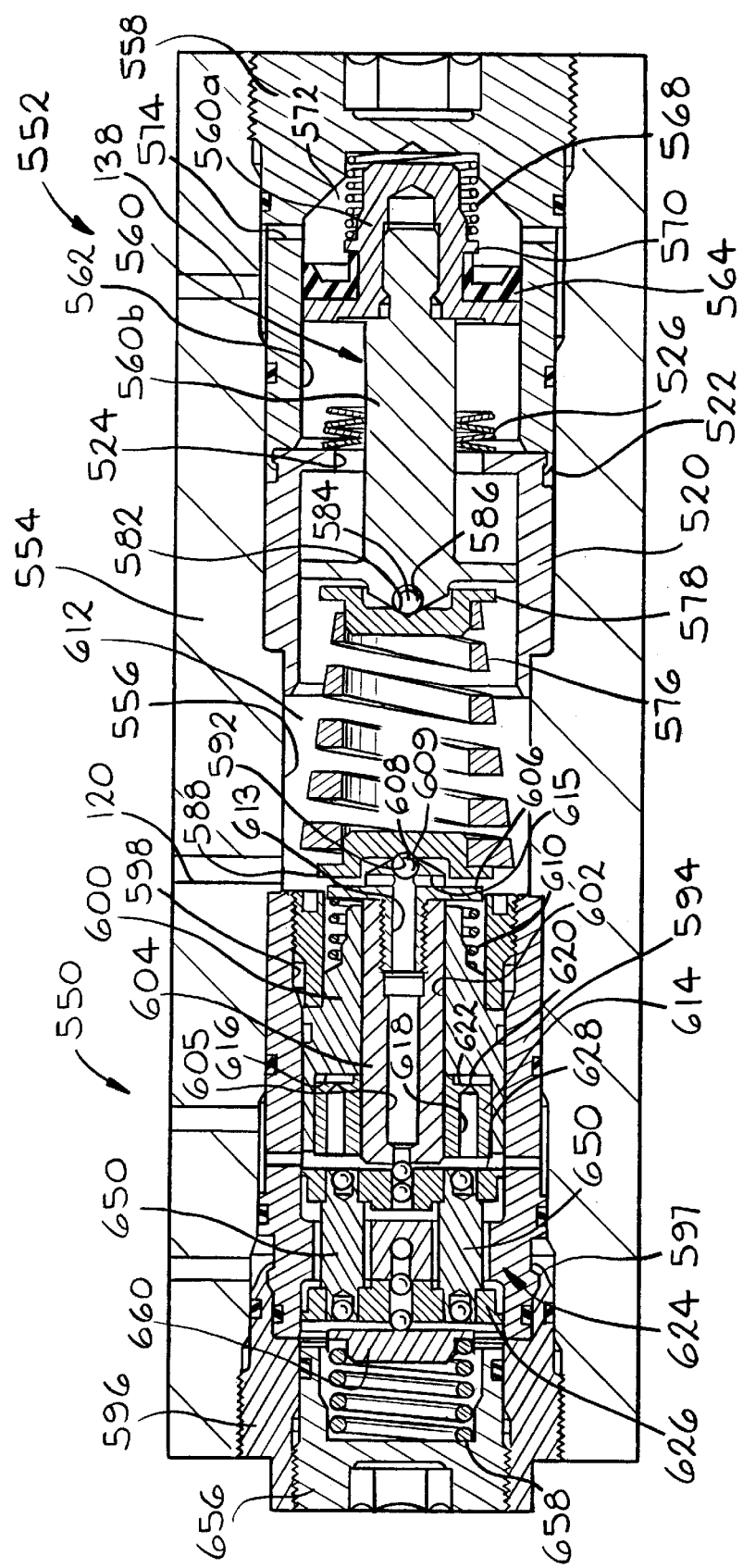
FIG. 10 is a sectional view of a fourth embodiment of a boost valve and a pedal travel simulator, in accordance with the present invention.

Referring now to FIG. 10, there is shown a fourth embodiment of a boost valve, indicated generally at 550, which can be used for the boost valve 116 of the brake system 10 illustrated in FIG. 1. The boost valve 550 is mechanically actuated by a pedal travel simulator, indicated generally at 552. The boost valve 550 and the pedal travel simulator 552 are similar in structure and function as the boost valve 200 and the pedal travel simulator 202, illustrated in FIG. 2.

The boost valve 550 and the pedal travel simulator 552 are housed in a valve body 554. The valve body 554 has a stepped bore 556 formed therein defining an axis Y. Generally, the components of the boost valve 550 and the pedal travel simulator 552 are co-axially aligned along the axis Y.

The pedal travel simulator 552 includes a cup shaped end plug 558 closing off one end of the bore 556 by a threaded connection therebetween. A cup shaped collar 520 is disposed in the bore 556 of the body 554 and is fixably attached to the end of the end plug 558 by a crimp 522. The collar 520 has a through bore 524 formed therethrough. A two-piece piston 560 is slidably disposed within a bore 562 formed in the end plug 558. The piston 560 has a first portion 560a and a second portion 560b which are fixably attached together, such as by a threaded connection. The second portion 560b extends from the first portion 560a and extends through the bore 524 of the collar 520. The first portion 560a of the piston 560 is sealingly engaged with the wall of the bore 562 by a seal 564 disposed about the first portion 560a. The piston 560 is biased leftward, as viewing FIG. 10, by a spring 568 acting against a radially extending shoulder 570 formed in the first portion 560a of the piston 560. Preferably, the pedal travel simulator 552 includes a plurality of Belleville washers 526 disposed about the second portion 560b of the piston 560 and axially located between the first portion 560a and the collar 520. The seal 564, the piston 560, and the closed end of the bore 562 of the end plug 558 generally define a first fluid chamber 572. The first fluid chamber 572 is in fluid communication with a control input port, such as the conduit 138 from the master cylinder 12 of the brake system 10 of FIG. 1, via a passageway 574 formed through the end plug 558.

The pedal travel simulator further includes a spring 576 which biases the piston 560 rightward, as viewing FIG. 10. Preferably, the spring 576 has a progressive spring rate characteristic to provide a non-linear boost gain. For example, it may be desirable to have a relatively slow rate of increase in pedal force during an initial portion of brake pedal travel from a brake released position to a partially applied brake position, and a relatively high rate of increase in pedal force during a final portion of brake pedal travel, such as is experienced in conventional brake systems. The right-hand end of the spring 576 engages a cup shaped first spring retainer 578. An annular seat 582 is formed in the first spring retainer 578. A ball 584 is press fit into a bore 586 formed in the left-hand end of the second portion 506b of the piston 560. The ball 584 engages the annular seat 582 of the of the first spring retainers 578. The annular seat 582 and the ball 584 cooperate to assist in axially aligning the force transmitted between the piston 560 and the first spring retainer 578. Of course, and suitable arrangement between the piston 560 and the first spring retainer 578 can be provided. As shown in FIG. 10, the left-hand end of the spring 576 engages a cup shaped second spring retainer 588 having an annular seat 592 formed therein.

The boost valve 550 includes a cup shaped first sleeve 594 sealingly disposed within the bore 556 of the housing 554. The first sleeve 594 is retained in the bore 556 by a second sleeve 596 threadably fastened to the end of the bore 556. Preferably, the first sleeve 594 is fastened to the second sleeve 596 by a crimped edge 597 formed in the second sleeve 596. The first sleeve 594 has a bore 598 formed in the right-hand end thereof. Disposed within the bore 598 is a third sleeve 600 having a through bore 602 formed therethrough. The third sleeve 600 can be threadably fastened to the first sleeve 594 to adjust the position therebetween. Slidably disposed within the bore 602 of the third sleeve 600 is a reaction spool 604 having a through bore 605. A cap 606 is fastened to the reaction spool 604. The cap 606 has a ball 608 press fit into a bore 609 formed in the cap 606. The ball 608 cooperates with the annular seat 592 of the second spring retainer 588 to assist in axially aligning the force transmitted between the second spring retainer 588 and the cap 606. A spring 610 biases the cap 606 and the reaction spool 604 rightward, as viewing FIG. 10.

A second fluid chamber 612 is generally defined by the bore 556 of the housing 554, the piston 560, the end plug 558, the first and third sleeves 594 and 600, and the reaction spool 604. The second fluid chamber 612 is in fluid communication with a reservoir port, such as the conduit 120 of the brake system 10 of FIG. 1. The second fluid chamber 612 is also in fluid communication with the bore 605 of the reaction spool 604 via an axial bore 613 and radial passageways 615 formed in the cap 606.

Figure 19:
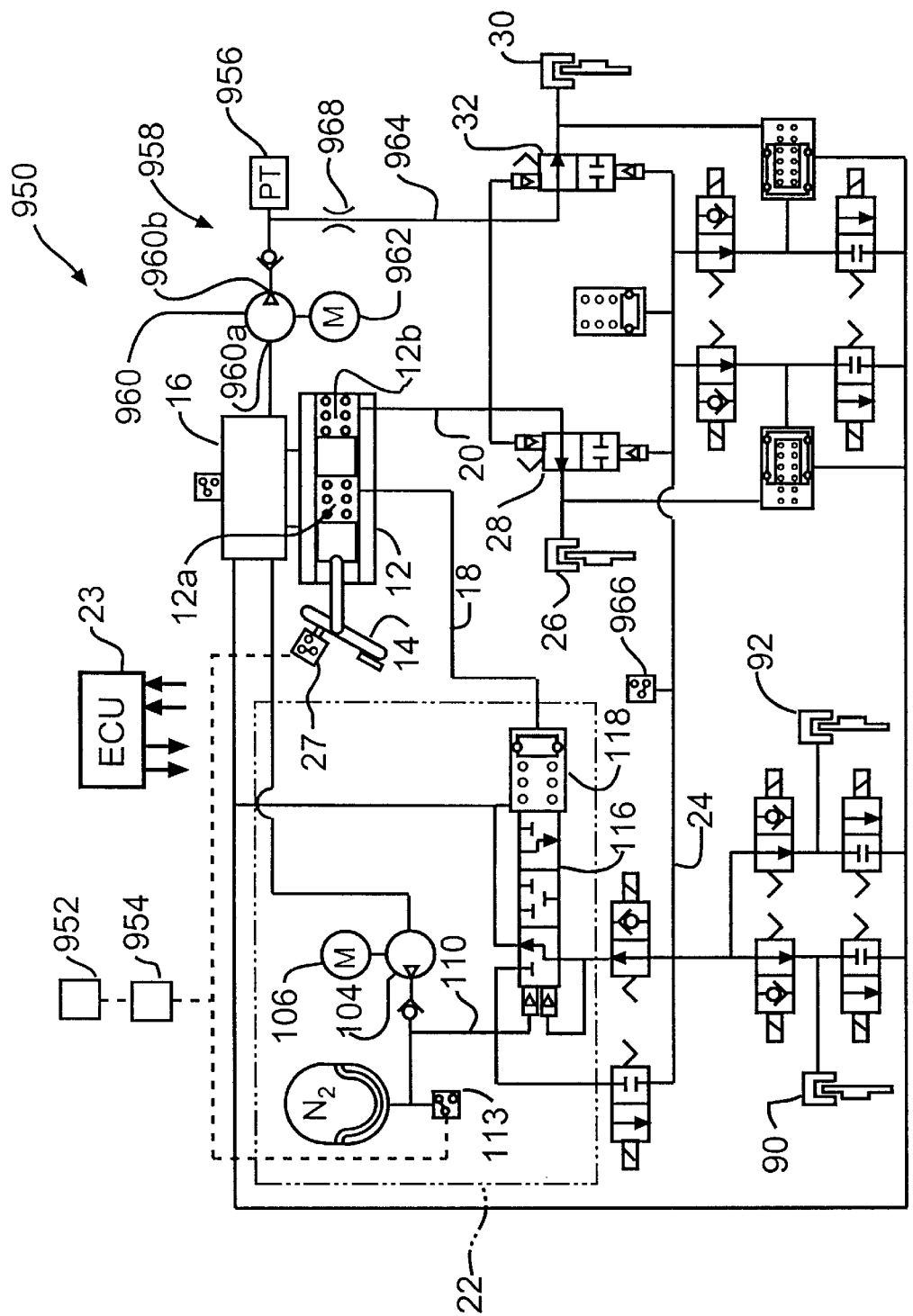
FIG. 19 is a hydraulic schematic of a fifth embodiment of a brake system, in accordance with the present invention.

As best shown in FIG. 19, the boost valve 550 includes an annular collar 614 fixably attached to the reaction spool 604, such as by a press fit. The annular collar 614 is disposed in a recess 616 formed in the left-hand end of the third sleeve 600, as viewing FIGS. 10 and 11. The annular collar 614 includes a plurality of longitudinal passageways 618 formed therethrough having flow restrictive orifices 620. A damping chamber 622 is generally defined by the recess 616, the reaction spool 604, and the right-hand end of the annular collar 614. The damping chamber 622 functions similarly to the damping chamber 259 of the boost valve 200 of FIGS. 2 and 3 such that the orifices 620 assist in dampening the motion of the reaction spool 604 to prevent the formation of undesirable hydraulic pulses which travel through the fluid within the boost valve 550.

Figure 11:
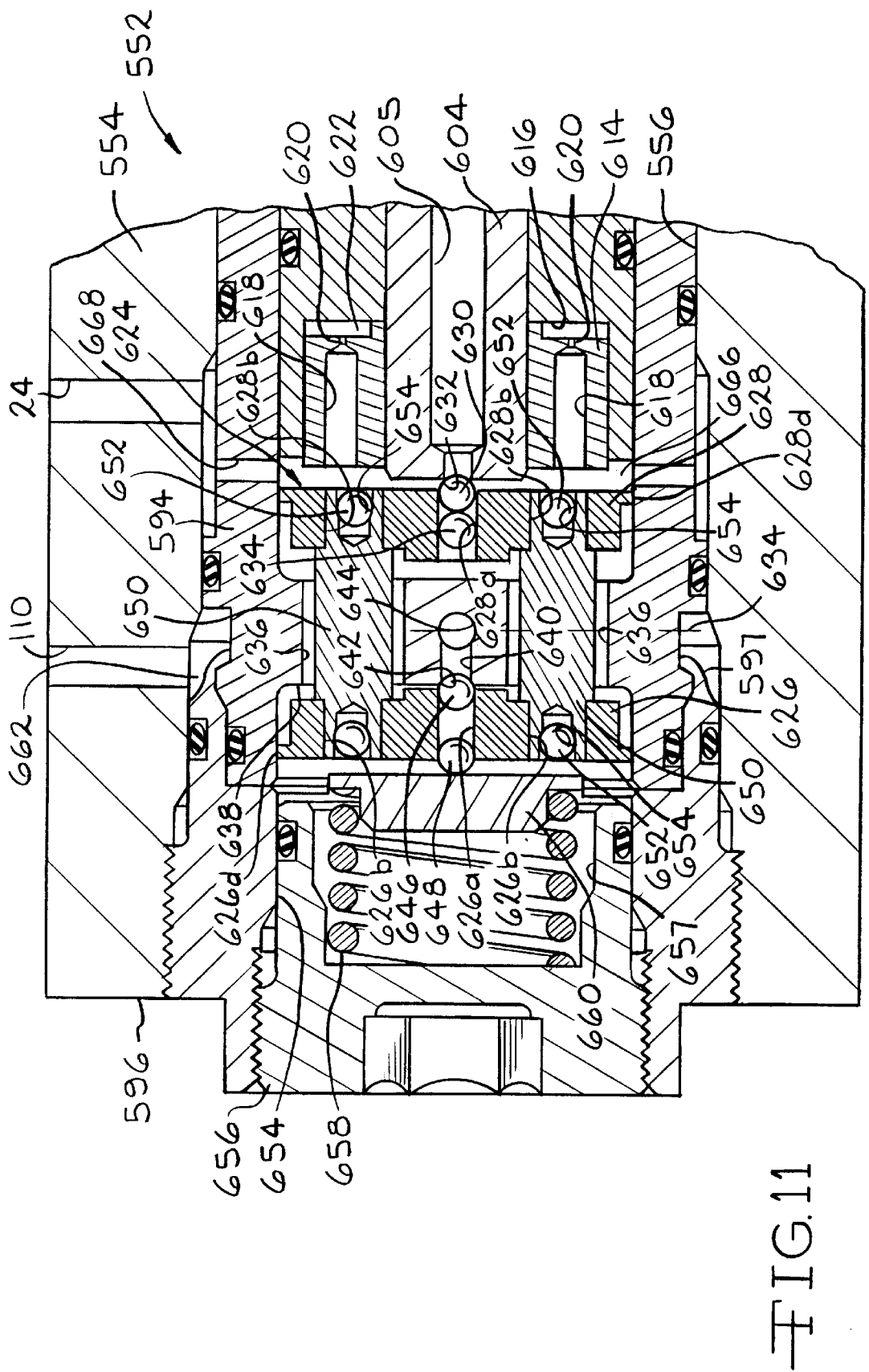
FIG. 11 is an enlarged sectional view of the boost valve illustrated in FIG. 10.

As best shown in FIG. 11, the boost valve 550 further includes a valve assembly, generally indicated at 624, which is generally positioned within the first sleeve 594 for limited axial movement. The valve assembly 624 includes first and second cylindrical discs 626 and 628, which are axially spaced apart from each other. The first and second cylindrical discs 626 and 628 are similar in construction, and can be manufactured as the same component with different orientations when installed into the boost valve 550. The first and second discs 626 and 628 include axial bores 626a and 628a, respectively, extending therethrough. The first and second discs 626 and 628 each include a pair of openings 626b and 628b, respectively, formed therethrough which are spaced apart from each other generally across the axial bores 626a and 628a, respectively.

The second disc 628 has a valve member, such as a first ball 630 press fit into the axial bore 628a of the second disc 628 and extending beyond the right-hand end of the second disc 628. The first ball 630 cooperates with a valve seat 632 formed in the reaction spool 604 to regulate the flow of fluid through the bore 605 of the reaction spool 604. Preferably, the first ball 630 is press fit from the left-hand end of the axial bore 628a to its position as shown in FIGS. 10 and 11. A second ball 634 may be press fit into the axial bore 628a of the second disc 628 to act as a stop to help prevent the first ball 630 from dislodging through the axial bore 628a. Preferably, the diameter of the second ball 634 is slightly greater than the diameter of the first ball 630.

The first sleeve 594 has a pair of bores 636 formed therethrough extending between the bore 598 and a recess 638 formed in the left-hand end of the first sleeve 594. A central bore 640 is formed in the first sleeve 594 between the pair of bores 636 and forms a valve seat 642. The central bore 640 is in fluid communication with a radial bore 644 formed through the first sleeve 594.

The first disc 626 has a valve member, such as a first ball 646 press fit into the axial bore 626a of the first disc 626 and extending beyond the right-hand end of the first disc 626. The first ball 646 cooperates with the valve seat 642 formed in the first sleeve 594 to regulate the flow of fluid through the central bore 640 and the radial bore 644. A second ball 648 is press fit into the axial bore 626a of the first disc 626 and extends beyond the left-hand end of the first disc 626.

The valve assembly 624 further includes a pair of cylindrical spacers 650 which are positioned between the first and second discs 626 and 628. The spacers 650 extend through the pair of bores 636 formed through the first sleeve 594, thereby allowing limited axial movement of the valve assembly 624 with respect to the first sleeve 594. The ends of the spacers 650 can be fixably attached to the first and second discs 626 and 628 by pressing a ball 652 into a bore 654 formed in the end of the spacers 650 to expand the tubular shaped wall of the end of the spacers 650 radially outwardly, thereby achieving a press fit between the end of the spacers 650 and the wall of the bores 628b.

The second sleeve 596 has a bore 654 formed therethrough. The bore 654 is closed off by an end plug 656 having a bore 657 formed therein which retains a spring 658. The spring 658 engages a spring retainer 660 which acts against the second ball 648 of the first disc 626. The spring retainer 660 and the ball 648 cooperate to assist in axially aligning the force transmitted between the spring retainer 660 and the ball 648. Preferably, the spring 658 has a relatively high spring rate to help stabilize the valve assembly 624 during operation thereof.

A third chamber 662 is generally defined by the first and second sleeves 594 and 596, the end plug 656, and the wall of the bore 556 of the housing 554. The third chamber 662 is in fluid communication with a high pressure input port, such as the conduit 110 of the brake system 10 of FIG. 1. The third chamber 662 is in fluid communication with the radial bore 644 of the first sleeve 594, as indicated by the phantom lines 664 extending therebetween as shown in FIG. 19.

A fourth chamber 666 is generally defined by the second disc 628, the first sleeve 594, the collar 614, the third sleeve 600, and the reaction spool 604. The fourth chamber 666 is in fluid communication with a boost output port, such as the supply conduit 24 of the brake system 10 of FIG. 1, via radial passageways 668 formed through the first sleeve 594. Generally, the valve assembly 624 is submersed within the fourth chamber 666.

Preferably, an annular gap is present between an outer peripheral edge 628d of the second disc 628 and the wall of the bore 598 of the first sleeve 594 to permit the passage of fluid. Preferably, an annular gap is present between an outer peripheral edge 626d of the first disc 626 and the cylindrical wall of the recess 638 of the first sleeve 594 to permit the passage of fluid. The annular gaps should be small enough to minimize the lateral movement of the valve assembly 624 yet large enough so that the balls 630 and 646 can properly seat on the valve seats 632 and 642, respectively. The annular gaps also help stabilize the valve assembly 624 as fluid flows through the annular gaps. Preferably, the axial length of the outer peripheral edges 626d and 628d are relatively short to mimic a sharp edge orifice to reduce the viscosity dependent characteristics of the flow of fluid through the valve assembly 624. If desired, the first and second discs 626 and 628 can have holes (not shown) similar to the holes 302b of the discs 302 of the boost valve 200 illustrated in FIGS. 6 and 7.

The operation of the boost valve 550 and the pedal travel simulator 552 shall now be described as being adapted for use in the brake system 10 of FIG. 1. If desired, the embodiment of the pedal travel simulator 552 can be adapted to be of a dual piston design, such as the pedal travel simulator 118 of the brake system 10 of FIG. 1. For the purposes of explanation, the first fluid chamber 572 of the pedal travel simulator 552 will be described as being connected to the brake system 10 similar to the second chamber 132 of the pedal travel simulator 118. Normally, when the master cylinder 12 is not generating pressurized fluid, the boost valve 550 is in the position illustrated in FIGS. 10 and 11 which is similar to the first position 122a, wherein the conduit 120 is in fluid communication with the supply conduit 24. The ball 630 is unseated from the valve seat 632 of the reaction spool 604, thereby allowing fluid communication between the second fluid chamber 612 to the fourth fluid chamber 666 via the bore 605 of the reaction spool 604. The ball 646 is seated on the valve seat 642 of the first sleeve 594, thereby closing fluid communication between the third and fourth fluid chambers 662 and 666.

When the driver depresses the brake pedal 14, the master cylinder 12 pressurizes the brake fluid in the conduit 18 which flows into the first fluid chamber 572. The first fluid chamber 572 expands, thereby causing the piston 560 to move leftward, as viewing FIG. 10. The movement of the piston 560 exerts a force on the spring 576 which is transmitted through the first and second spring retainers 578 and 588 to the cap 606 and the reaction spool 604. The force acting on the reaction spool 604 causes the reaction spool 604 to move leftward, as viewing FIGS. 10 and 11.

The movement of the reaction spool 604 moves the collar 614. As the collar 614 moves leftward, the damping chamber 622 expands. Fluid enters the damping chamber 622 via the orifices 620. The orifices 620 and the damping chamber 622 cooperate to assist in damping the motion of the reaction spool 604 to prevent the formation of undesirable hydraulic pulses which travel through the fluid within the boost valve 550. The movement of the reaction spool 604 also causes the ball 630 to seat on the valve seat 632, thereby closing fluid communication between the second fluid chamber 612 and the fourth fluid chamber 666. Further movement of the reaction spool 604 pushes against the valve assembly 624 causing the valve assembly 624 to move leftward, as viewing FIGS. 10 and 11. Movement of the valve assembly 624 causes the ball 646 to unseat from the valve seat 642 formed on the first sleeve 594. The boost valve 550 is now in a position similar to the third position 122c of the boost valve 116 of FIG. 1. Thus, the pressurized fluid from the fluid pressure generator circuit 22 is allowed to flow into the fourth fluid chamber 666 via the conduit 110, the radial bore 644, and the central bore 640. The pressurized fluid flows around the valve assembly 624 around the second disc 628 and out through the supply conduit 24. The valve assembly 624 is moved back to the right when the pressure within the fourth fluid chamber 666 rises above the pressure from the master cylinder 12 multiplied by the predetermined boost ratio. The boost valve 550 will eventually reach an equilibrium wherein the balls 630 and 646 are seated on the valve seats 632 and 642, respectively, and will stay in a position similar to the second position 122b of the boost valve 116 of FIG. 1. When the driver changes the pressure generated from the master cylinder 12 by changing the position of the brake pedal 14, the boost valve 550 will operate as described above, thereby maintaining a pressure in the supply conduit 24 at a factor above the pressure generated by the master cylinder 12 as determined by the boost ratio. When the driver releases the brake pedal 14, the piston 560 will return to its at rest position. The boost valve 550 will then return to the position as that illustrated in FIGS. 10 and 11.

During a hard brake apply, the pressurized fluid from the master cylinder 12 may expand the first fluid chamber 572 so that the first portion 560a of the piston 560 compresses the plurality of Belleville washers 526. Preferably, the spring rate of the Belleville washers 526 is greater than the spring rate of the spring 575. The Belleville washers 526 provide for a pedal feel which is similar to conventional boosted brake system, which may produce a desirable pedal feel for the driver of the vehicle. The Belleville washers 526 also provide protection for the components of the boost valve 550, such as the balls 584, 608, 630, and 648, from a sharp impact caused by the sudden advancement of the piston 560.

Figure 12:
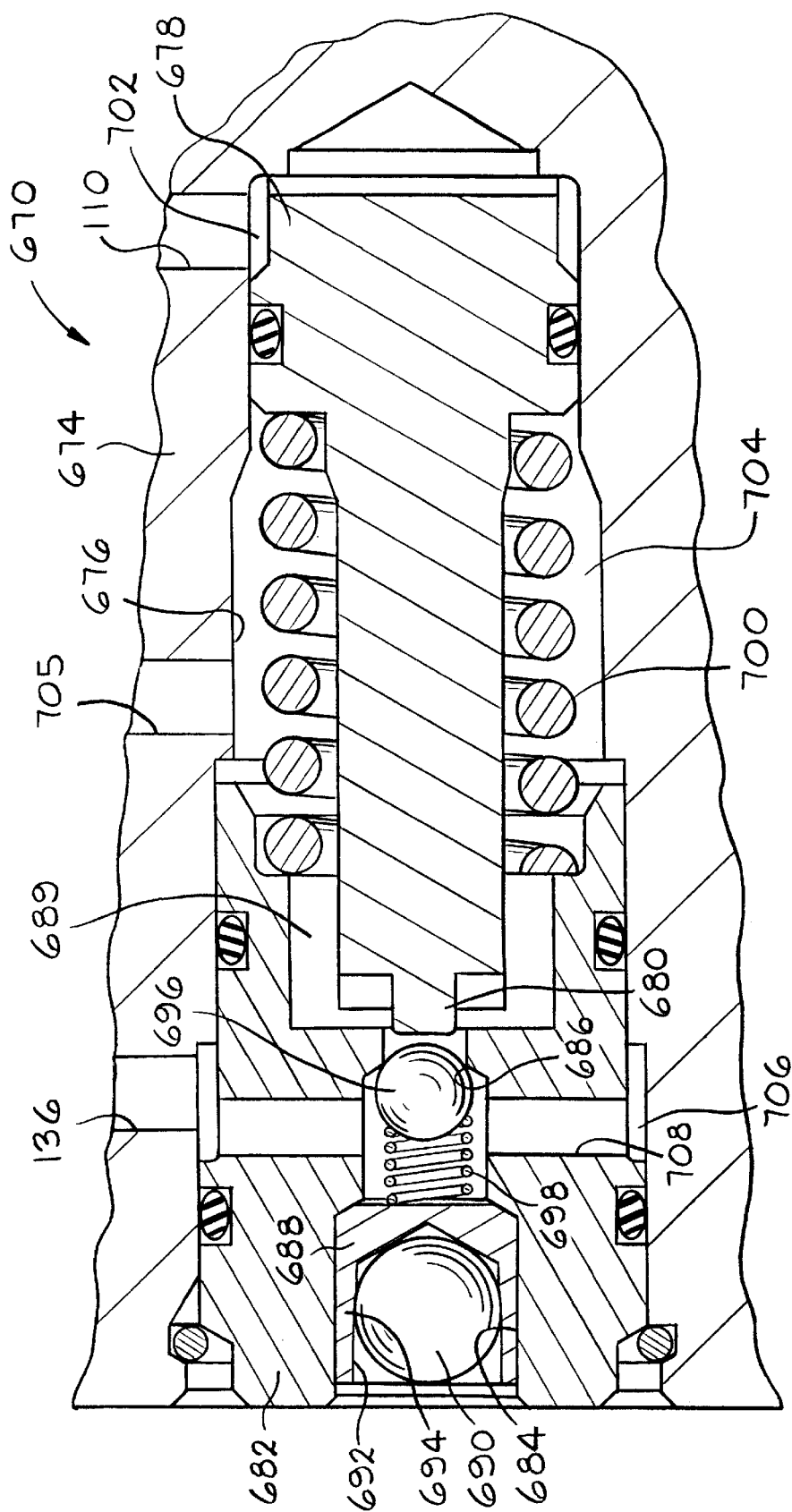
FIG. 12 is a sectional view of an alternate embodiment of a pedal travel simulator valve, in accordance with the present invention.

There is illustrated in FIG. 12 an alternate embodiment of a pedal travel simulator valve, indicated generally at 670, which can be used for example, as the pedal travel simulator valves 140 and 144 of the brake system 10, illustrated in FIG. 1. The valve 670 includes a housing 674 having a stepped bore 676 formed therein. A plunger 678 having an axially extending pin 680 is slidably disposed within the bore 676. The valve 670 further includes and end plug 682 disposed in the bore 676 of the housing 674. The end plug 682 has a bore 684 having a necked down portion forming a valve seat 686. A radially extending slot 689 is formed in the end plug 682 adjacent the pin 680 of the plunger 678.

A ball plug 688 closes off the bore 684 of the end plug 682. The ball plug 688 can be fastened to the end plug 682 by any suitable manner, such as by a press fit. The press fit can be accomplished by inserting a ball 690 into a bore 692 formed in the ball plug 688 such that the ball 690 expands a tubular wall 694 radially outwardly to fixably engage the wall of the bore 684 of the end plug 682. The valve 670 further includes a ball 696 which is biased against the valve seat 686 by a spring 698. The plunger 678 is biased rightward, as viewing FIG. 12, by a spring 700.

Figure 20:
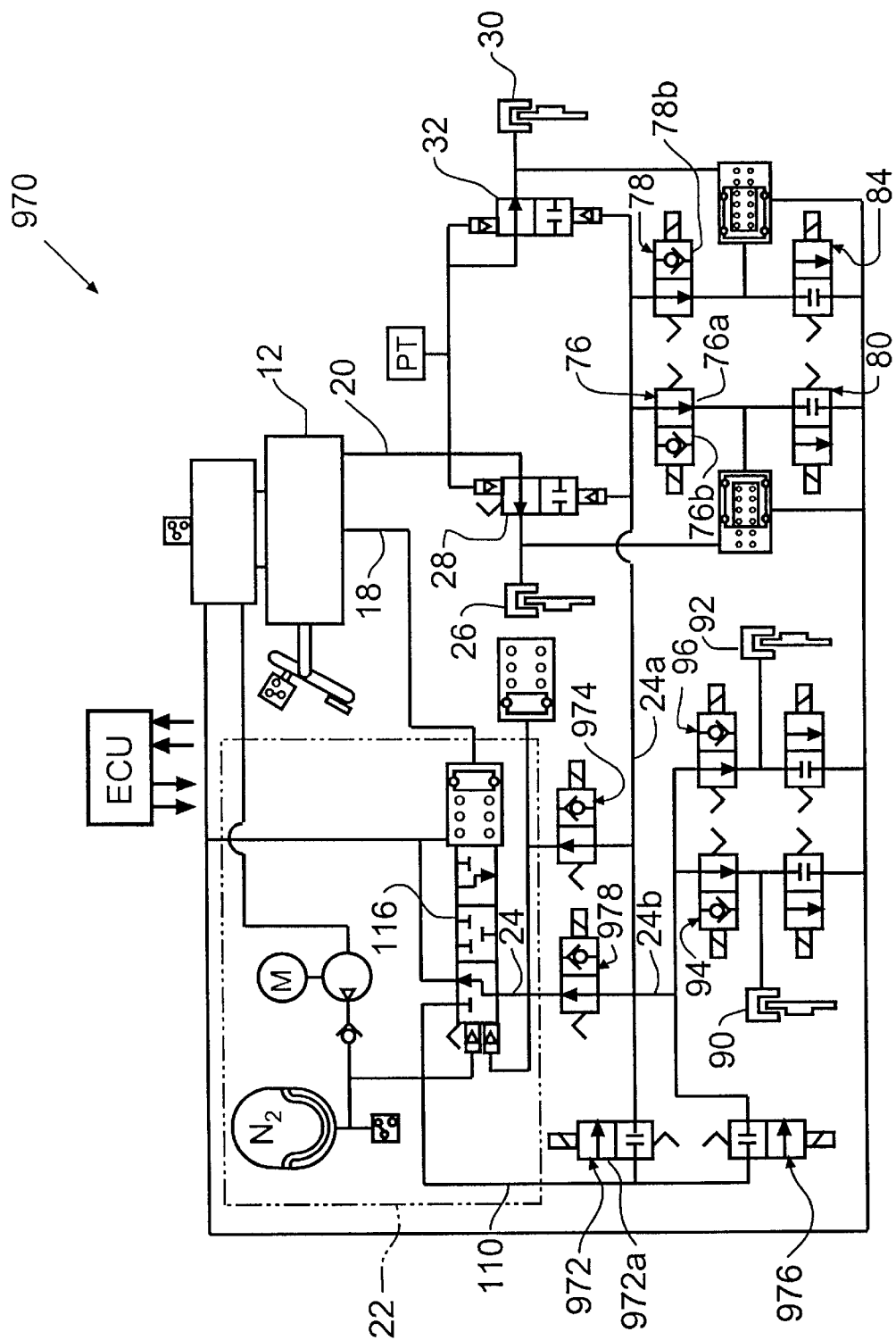
FIG. 20 is a hydraulic schematic of a sixth embodiment of a brake system, in accordance with the present invention.

A first chamber 702 is generally defined by the right-hand end of the plunger 678, a viewing FIG. 20, and the wall of the closed end of the bore 676 of the housing 674. The first chamber 702 is in fluid communication of a high pressure source, such as the conduit 110 of the brake system 10 of FIG. 1. A second chamber 704 is generally defined by wall of the bore 676, the plunger 678, and the end plug 682. The second chamber 704 is in fluid communication with a fluid chamber of a pedal travel simulator, such as the chamber 130 of the pedal travel simulator 118 of the brake system 10 of FIG. 1, via a conduit 705. A third chamber 706 is generally defined by the wall of the bore 676 of the housing 674, the bore 684 of the end plug 682, and walls of radial passageways 708 formed in the end plug 682. The third chamber 706 is in fluid communication with a conduit 708, such the conduit 136 to the master cylinder 12 of the brake system 10 of FIG. 1.

The operation of the pedal travel simulator valve 670 will now be described in cooperation with the brake system 10 of FIG. 1. The valve 670 as illustrated in FIG. 12, is in a position corresponding to the position 140a of the pedal travel simulator valve 140 of the brake system 10. At this position, the ball 696 is seated on the valve seat 686. As fluid enters the first chamber 702 via the conduit 110 from the fluid pressure generator circuit 22, the plunger 678 is advanced leftward, as viewing FIG. 12. Continued movement of the plunger 678 causes the pin 680 to lift the ball 696 from the from the valve seat 686, thereby allowing fluid to flow between the second and third chambers 704 and 706 via the slots 689 and the passageways 708. The valve 670 is then in a position corresponding to the position 140b of the pedal travel simulator valve 140.

Note that fluid can flow in a direction from the second chamber 704 to the third chamber 706 if the pressure within the second chamber 704 is sufficient to lift the ball 696 from the valve seat 686 against the force of the spring 698. This arrangement corresponds to the check valve 142 schematically illustrated in the pedal travel simulator valve 140.

Figure 13:
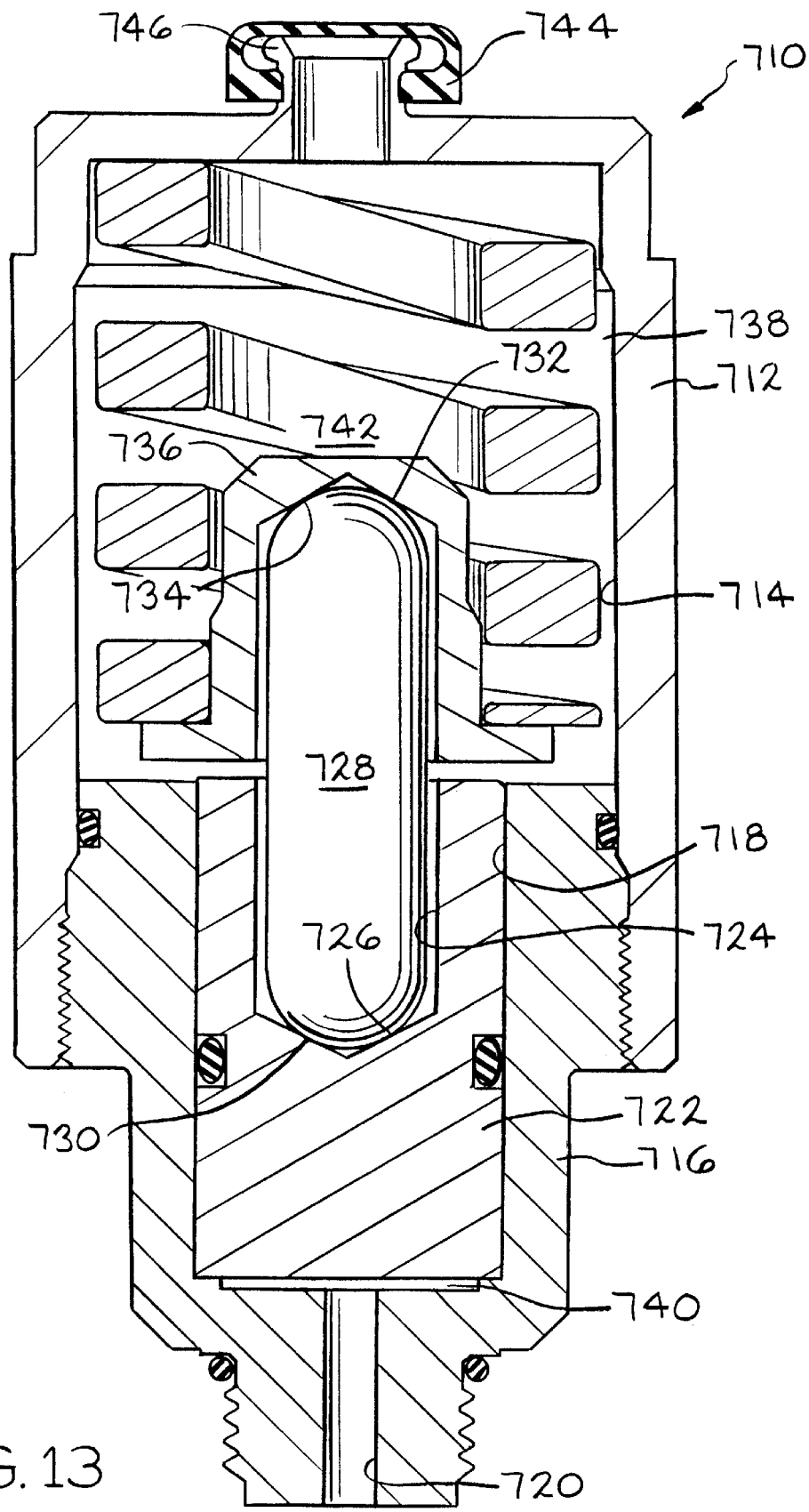
FIG. 13 is a sectional view of an alternate embodiment of a compliance accumulator, in accordance with the present invention.

There is illustrated in FIG. 13 an alternate embodiment of a compliance accumulator, indicated generally at 710, which can be used for example, as the compliance accumulator 148 of the brake system 10 illustrated in FIG. 1. The compliance accumulator 710 includes a cup shaped housing 712 having a bore 714 formed therein. An end plug 716 is fastened to the housing 712 to close off the bore 714. The end plug 716 has a bore 718 and a passageway 720 formed therein. A piston 722 is slidably disposed within the bore 718 of the end plug 716. The piston 722 has a bore 724 formed therein which ends into a conical shaped surface 726. The compliance accumulator 710 further includes a cylindrical pin 728 preferably having rounded ends 730 and 732. The pin 728 is disposed within the bore 724 of the piston 722. The end 730 of the pin 728 contacts the conical surface 726 of the piston 722. The end 732 of the pin 728 contacts a conical surface 734 of a spring retainer 736. A spring 738 biases the spring retainer 736, the pin 728, and the piston 722 downward, as viewing FIG. 13. The rounded ends 730 and 732 of the pin 728 cooperate with the conical surfaces 726 and 734 to help reduce radial misalignment forces of the piston 722 within the bore 718. A fluid chamber 740 is generally defined by wall of the bore 718 of the end plug 716 and the piston 722. The fluid chamber 740 is in fluid communication with the passageway 720. An air chamber 742 is generally defined by the closed end of the bore 714 of the housing 712, the end plug 716, and the piston 722. Preferably, the air chamber 742 is vented to atmosphere, such as by an elastomeric cover 744 fitted over a port 746 formed in the housing 712.

The operation of the compliance accumulator 710 will now be described in cooperation with the brake system 10 of FIG. 1. The force of the spring 738 is transmitted to the piston 722 via the spring retainer 736 and the pin 728 to pressurize fluid which is in the fluid chamber 740. Typically, pressurized fluid is stored in the fluid chamber 740 to provide relatively instantaneous flow to the supply conduit 24 until the boost valve 116 can respond with sufficient flow to the supply conduit 24.

Figure 14:
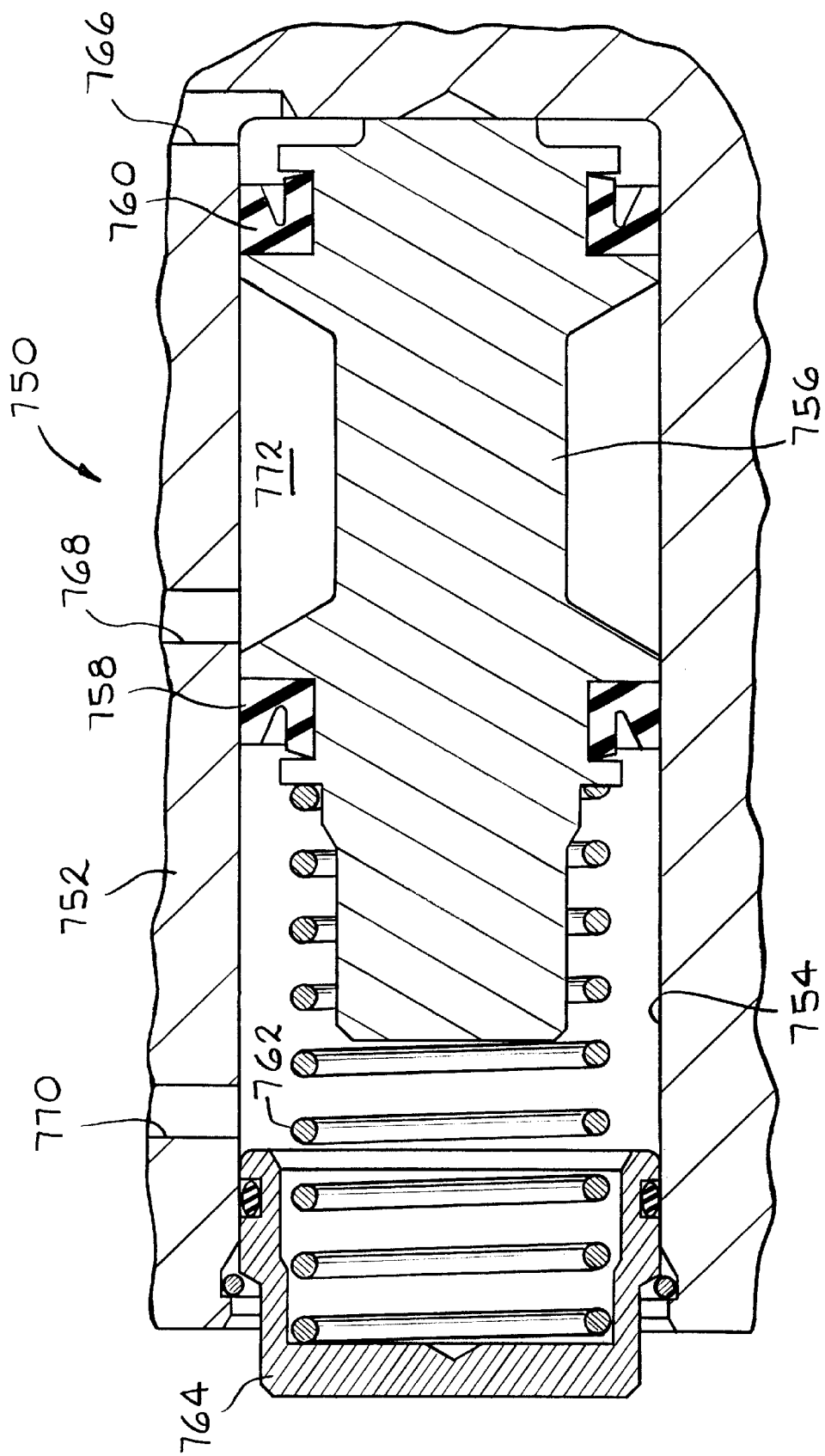
FIG. 14 is a sectional view of an alternate embodiment of a fluid separator assembly in accordance with the present invention.

There is illustrated in FIG. 14 an alternate embodiment of a fluid separator assembly, indicated generally at 750, which can be used for example, as the fluid separator assemblies 36 and 58 of the brake system 10 illustrated in FIG. 1. The fluid separator assembly 750 includes a housing 752 having a bore 754 formed therein. A piston 756 is slidably disposed therein, and sealingly engaged with the wall of the bore 754 by a pair of lip seals 758 and 760. The piston 756 is biased in a direction towards the closed end of the bore 754 by a spring 762 retained by a plug 764 attached to the housing 752. The housing 752 has first, second, and third conduits 766, 768, and 770 formed therein which are in fluid communication with the bore 754. The conduits 766, 768, and 770 correspond to the conduits 54, 52, and 34, respectively, for the fluid separator assembly 36 of the brake system 10 of FIG. 1. An annular space 772 is generally defined between the seals 758 and 760 and is in fluid communication with the conduit 768 which is preferably in fluid communication with a fluid reservoir. The conduit 768 provides means for sensing a fluid leak across one or both of the seals 758 and 760 if a sensor (not shown) is used to detect an abnormal pressure reading. For example, if the seal 758 were to fail, the driver may experience a reduction in the deceleration of the vehicle due to the associated wheel brake losing pressurized fluid while in a boosted braking operation or might experience a pedal drop during an unboosted braking operation. In another example, if the seal 760 were to fail, the motor and pump might be abnormally actuated to compensate for the loss in fluid pressure from the associated wheel brake. A sensor and indicator may be used to warn the driver of the condition.

Figure 15:
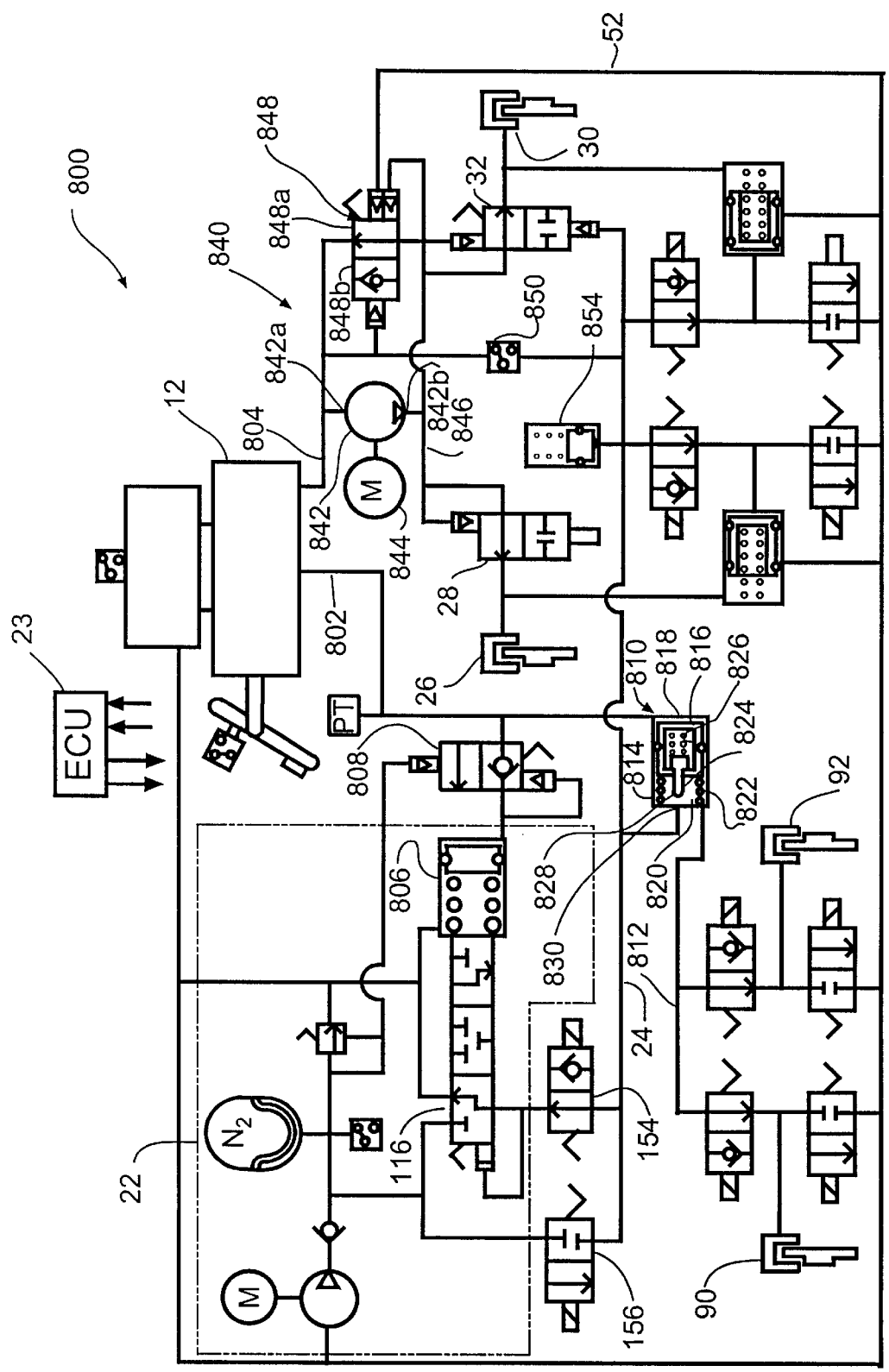
FIG. 15 is a hydraulic schematic of a second embodiment of a brake system, in accordance with the present invention.

Referring now to FIG. 15, there is illustrated a second embodiment of a brake system, indicated generally at 800. The brake system 800 is similar to the brake system 10 of FIG. 1, and similar components used in both brake systems 10 and 800 will have similar reference numerals and only the differences or additional components shall be described. The brake system 800 is preferably used as a vertical split system, such that the master cylinder 12 is a tandem master cylinder which pressurizes fluid into two conduits 802 and 804. The conduit 802 is selectively in fluid communication with the wheel brakes 90 and 92, and the conduit 804 is selectively in fluid communication with the wheel brakes 26 and 30. For example, the wheel brakes 26 and 30 can be front wheel brakes, while the wheel brakes 90 and 92 can be the rear wheel brakes.

One of the differences between the brake systems 10 and 800 is that the brake system 800 has a pedal travel simulator 806 which is of a single piston design. Note also that the brake system 800 has a single pedal travel simulator valve 808 in fluid communication between the conduit 802 and the pedal travel simulator 806.

Another difference between the brake systems 10 and 800 is that the brake system 800 has a shuttle valve 810 in fluid communication with the supply conduit 24 from the fluid pressure generator circuit 22 and a conduit 812 generally in fluid communication with the wheel brakes 90 and 92. The shuttle valve 810 includes a bore 814 having a piston 816 slidably disposed therein. The piston 816 divides the bore 814 into first and second chambers 818 and 820. The piston 816 is biased rightward, as viewing FIG. 15, by a spring 822. A spring biased pin 824 is slidably disposed with a bore 826 formed in the piston 816. The pin 824 has an end 828 which cooperates with a valve seat 830 to close off fluid communication between the supply conduit 24 and the conduit 812 when the end 828 of the pin 824 is seated against the valve seat 830. The first chamber 818 is in fluid communication with the conduit 802. The second chamber 820 is generally always in fluid communication with the conduit 812. The second chamber 820 is in fluid communication with the supply conduit 24 when the pin 824 is unseated from the valve seat 830.

The operation of the shuttle valve 810 shall now be discussed. When the master cylinder 12 is actuated, pressurized fluid is sent to the conduit 802. During boosted braking, the fluid pressure generator circuit 22 pressurizes the fluid within the supply conduit 24 at a pressure which is normally higher than pressure within the conduit 802. Thus, the fluid within the second chamber 820 is at a higher pressure than the fluid within the first chamber 818. This pressure difference moves the piston 816 rightward, as shown in FIG. 15. When the piston 816 is in this position, the end 828 of the pin 824 is lifted from the valve seat 830, thereby permitting fluid to flow from the supply conduit 24 to flow into the conduit 812 to energize the wheel brakes 90 and 92. In case the pressure of the fluid within the supply conduit 24 falls below a predetermined amount below the pressure within the conduit 802, such as for example, during failure of the boost valve 116, the piston 816 moves leftward by the expansion of the first chamber 818. The movement of the piston 816 causes the end 828 of the pin 824 to seat against the valve seat 830, thereby closing off fluid communication between the supply conduit 24 and the conduit 812. The shuttle valve 810 then operates similarly to a fluid separator assembly with a manual push through from the master cylinder 12 to the wheel brakes 90 and 92.

Another difference between the brake system 10 of FIG. 1 and the brake system 800 of FIG. 15 is the addition of a back-up fluid pressure generator circuit, indicated generally at 840. The back-up fluid pressure generator circuit 840 generally provides pressurized fluid to the wheel brakes 26 and 30 during certain failure conditions, as will be explained in detail below. The back-up fluid pressure generator circuit 840 includes a pump 842 which is driven by a motor 844.

The pump 842 has an inlet 842a in fluid communication with the conduit 804, and an outlet 842b in fluid communication with the first and second base brake valves 28 and 32 via a conduit 846. The pump 842 operates to draw fluid from the reservoir 16 and supply the fluid at an increase pressure to the conduit 846. A normally open 2-position, 2-way pilot operated pressure regulator valve 848 regulates the flow of fluid between the master cylinder 12 and the first and second base brake valves 28 and 32. The pressure regulator valve 848 has a first open position 848a, and a second position 848b which allows fluid to flow in a direction from the master cylinder 12 to the first and second base brake valves 28 and 32 but not in the opposite direction. The pressure regulator valve 848 senses the pressure differential between the pressure within the conduit 804 and with the pressure within the conduit 846 and the return conduit 52. Preferably, the brake system 800 includes a pressure switch 850 (or pressure transducer) in fluid communication with the conduit 804 and the supply conduit 24. The pressure switch 850 senses the difference in pressure between the master cylinder 12 via the conduit 804 and the fluid pressure generator circuit 22 via the supply conduit 24.

If the pressure from the fluid pressure generator circuit 22 falls below a predetermined ratio value compared to the pressure generated by the master cylinder 12, the back-up fluid pressure generator circuit 840 may be actuated to provide pressurized fluid to the wheel brakes 26 and 30. Thus, the brake system 800 is especially suited for relatively heavy vehicles, such as medium or heavy duty vehicles, which could require relatively large pedal forces to decelerate the vehicle in case of a failure of the fluid pressure generator circuit 22. The pressure switch 850 senses the difference in pressure generated from the master cylinder 12 and the pressure generated by the fluid pressure generator circuit 22. If the pressure from the fluid pressure generator circuit 22 falls below the predetermined ratio value, the ECU 23 actuates the motor 844 of the pump 842, thereby supplying pressurized fluid to the conduit 846. The pressurized fluid within the conduit 846 causes the first and second base brake valves 28 and 32 to shuttle to their open positions, as illustrated in FIG. 15, thereby supplying pressurized fluid to the wheel brakes 26 and 30. Note that the fluid pressure from the outlet 842a of the pump 842 will typically be greater than the fluid pressure generated by the master cylinder 12, thereby causing the pressure regulator valve 848 to shuttle to its position 848b. When the pressure within the conduit 846 from the pump 842 reaches a predetermined boost ratio in relation to the pressure generated from the master cylinder 12, the pressure regulator valve 848 shuttles to its open position, as illustrated in FIG. 15, to create a return loop path for the pump 842. The pressure regulator valve 848 will preferably shuttle between the positions 848a and 848b to maintain the pressure within the conduit 848 at a pressure level approximately equal to the pressure from the master cylinder 12 multiplied by the predetermined boost ratio.

Yet another difference between the brake system 10 of FIG. 1 and the brake system 800 of FIG. 15 is a compliance accumulator 854 which functions similarly to the compliance accumulator 148 of the brake system 10 of FIG. 1. Unlike the brake system 10, however, the compliance accumulator 854 is not in fluid communication with the supply conduit 24 at a location between the boost valve 116 and the override isolation valve 154, but rather is in fluid communication with the conduit 24 downstream from the override isolation valve 154, as shown in FIG. 15. When the compliance accumulator 854 is located in the position as shown in FIG. 15, the override dump valve 156 can be configured with a relatively small orifice within a valve seat arrangement (not shown). Generally, the smaller the orifice, the less force it takes to close a valve seat. Therefore, the size of the solenoid for the dump valve 156 can be smaller and, therefore, generally less expensive.

Figure 16:
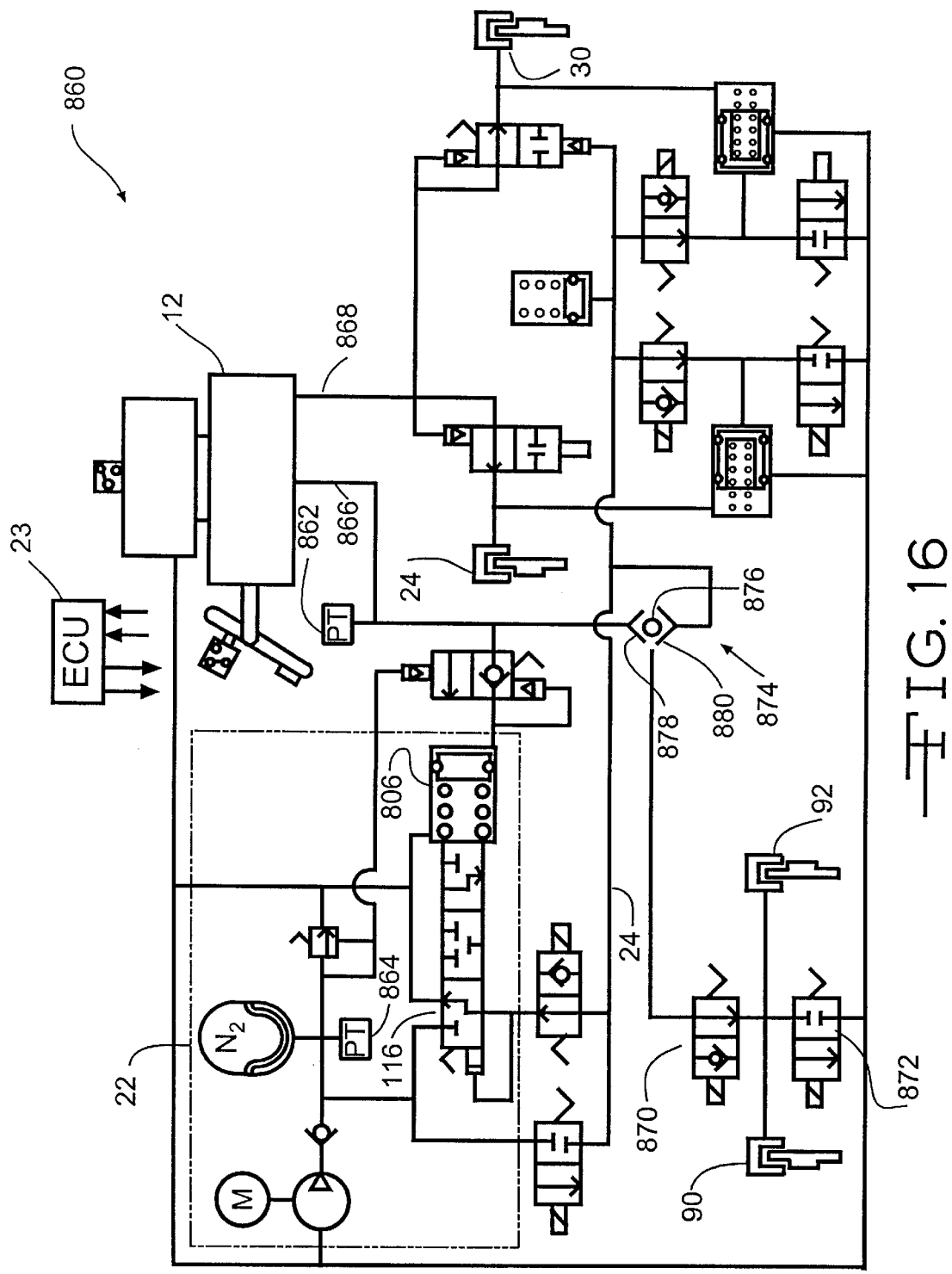
FIG. 16 is a hydraulic schematic of a third embodiment of a brake system, in accordance with the present invention.

Referring now to FIG. 16, there is illustrated a third embodiment of a brake system, indicated generally at 860, in accordance with the present invention. The brake system 860 is similar to the brake system 10 of FIG. 1, and similar components used in both brake systems 10 and 860 will have similar reference numerals and only the differences or additional components shall be described. The brake system 860 has pressure transducers 862 and 864 instead of pressure switches. Pressure transducers provide for a more detailed monitoring of the brake system 860, such as for regulating the brake system 860 during a VSC brake operation, as described above with respect to the brake system 10 of FIG. 1.

The brake system 860 preferably has a tandem master cylinder 12 which pressurizes fluid into a pair of conduits 866 and 868. The conduit 866 is selectively in fluid communication with the wheel brakes 90 and 92. The conduit 868 is selectively in fluid communication with the wheel brakes 24 and 30. The brake system 860 can be configured, for example, so that the wheel brakes 24 and 30 are associated with the front wheel brakes, while the wheel brakes 90 and 92 are associated with the rear wheel brakes. Note that the brake system 860 includes a single isolation valve 870 and a single dump valve 872 for simultaneously regulating the pressure for the wheels brakes 90 and 92, which can be associated with the rear wheels, for example. The isolation valve 870 functions similarly as the third and fourth isolation valves 94 and 96 of the brake system 10 of FIG. 1 as described above. Likewise, the dump valve 872 functions similarly as the third and fourth dump valves 98 and 102 of the brake system 10 of FIG. 1.

A difference between the brake system 800 illustrated in FIG. 15 and the brake system 860 illustrated in FIG. 16 is that the brake system 860 includes an alternate embodiment of a shuttle valve 874 in place of the shuttle valve 810 of the brake system 800. As shown in FIG. 16, the shuttle valve 874 schematically includes a single ball 876 movable between a pair of valve seats 878 and 880. Generally, the shuttle valve 874 performs the same function as the shuttle valve 810 of the brake system 800. When the brake system 860 is operating under a boosted braking condition, the ball 876 seats on the valve seat 878, thereby restricting the flow of fluid between the master cylinder 12 and the wheel brakes 90 and 92, but permitting the flow of fluid between the fluid pressure generator circuit 22 and the wheel brakes 90 and 92 via the supply conduit 24. When the pressure from the fluid pressure generator circuit 22 falls below a predetermined amount of pressure, such as during failure of the boost valve 116, the ball 668 seats on the valve seat 880 to restrict the flow of fluid from the boost system to the wheel brakes 90 and 92, while permitting the flow of fluid from the master cylinder 12 to the wheel brakes 90 and 92.

Figure 17:
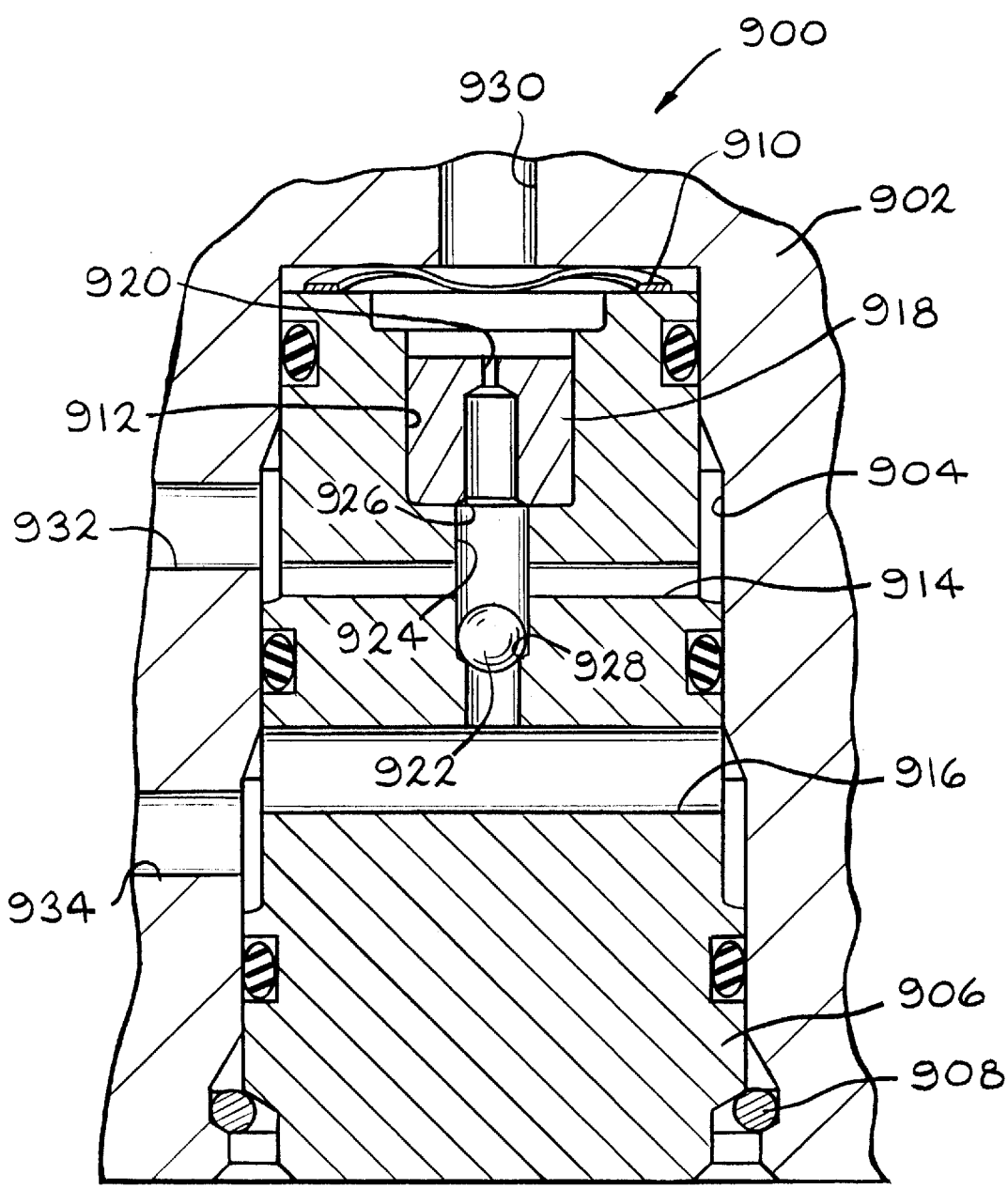
FIG. 17 is a sectional view of a shuttle valve, in accordance with the present invention, which can be used in the brake system illustrated FIG. 16.

There is illustrated in FIG. 17 an alternate embodiment of a shuttle valve, indicated generally at 900, which can be used for example, as the shuttle valve 874 of the brake system 860 illustrated in FIG. 16. The shuttle valve 900 includes a housing 902 having a bore 904 formed therein. A main body 906 is disposed in the bore 904 of the housing 902. The body 906 is retained in the bore 904 by the cooperation of a retaining ring 908 and a wave spring 910. The body 906 has a stepped axial bore 912 formed therein. A pair of radial passageways 914 and 916 are formed through the body 906 and are in fluid communication with the bore 912. Preferably, press fit into the bore 912 is a block 918 having a restrictive orifice 920 formed therein. A ball 922 is movably disposed in a first portion 924 of the bore 912 of the body 906. A pair of valve seats 926 and 928 are formed in the body 906 adjacent the ends of the first portion 924. The diameter of the first portion 924 of the bore 912 is preferably slightly larger than the diameter of the ball 922. Thus, the ball 922 can travel through the first portion 924 of the bore 912 between the valve seats 926 and 928. Preferably, the shuttle valve 900 is oriented so that the weight of the ball 922 biases the ball 922 downward against the valve seat 928, as illustrated in FIG. 17.

The operation of the shuttle valve 900 will now be described in cooperation with the brake system 860 of FIG. 16. The housing 902 has first, second, and third conduits 930, 932, and 934 formed therein which are in fluid communication with the bore 904. The first conduit 930 is in fluid communication with the closed end of the bore 904 and the master cylinder 12. The second conduit 932 is in fluid communication with the wheel brakes 90 and 92. The third conduit 934 is in fluid communication with the supply conduit 24 from the boost valve 116. When the brake system 860 is not operating under a boosted braking condition, the ball 922 seats on the valve seat 928, thereby permitting the flow of fluid from the first conduit 930 (master cylinder 12) to the second conduit 932 (wheel brakes 90 and 92). When the brake system 860 is operating under normal boosted braking condition, the fluid flow and the pressure from the third conduit 934 (boost valve 116) cause the ball 922 to rise upward against the valve seat 926. Fluid is then free to flow from the third conduit 934 to the second conduit 932. However, when the pressure from the fluid pressure generator circuit 22 or boost valve 116 falls below the pressure generated by the master cylinder 12, such as during failure of the boost valve 116, the ball 922 seats on the valve seat 928 to permit the flow of fluid from the first conduit 930 (master cylinder 12) to the second conduit 932 (wheel brakes 90 and 92).

Under certain circumstances, it may be desirable to provide improved and refined pressure regulation during braking operations, such as TC and VSC braking operations. The brake systems of the present invention, such as the brake system 10 of FIG. 1, can include an override isolation valve, such as the override isolation valve 154 of the brake system 10, having a proportionally controlled solenoid. Likewise, an override dump valve, such as the override dump valve 156 of the brake system 10, having a proportionally controlled solenoid. Besides providing improved and refined pressure regulation, the proportionally controlled valves can provide gradual and even braking pressure to the wheel brakes of the brake system instead of pulsing or cyclically applying braking pressure. This gradual and even braking pressure may be suited for other types of brake operations, such as autonomous cruise control braking. Preferably, the brake system has pressure transducers in place of pressure switches. For example, a pressure transducer can be in fluid communication with the supply conduit for monitoring the pressure within the supply conduit to assist in controlling the proportional solenoids of the override isolation and dump valves.

Figure 18:
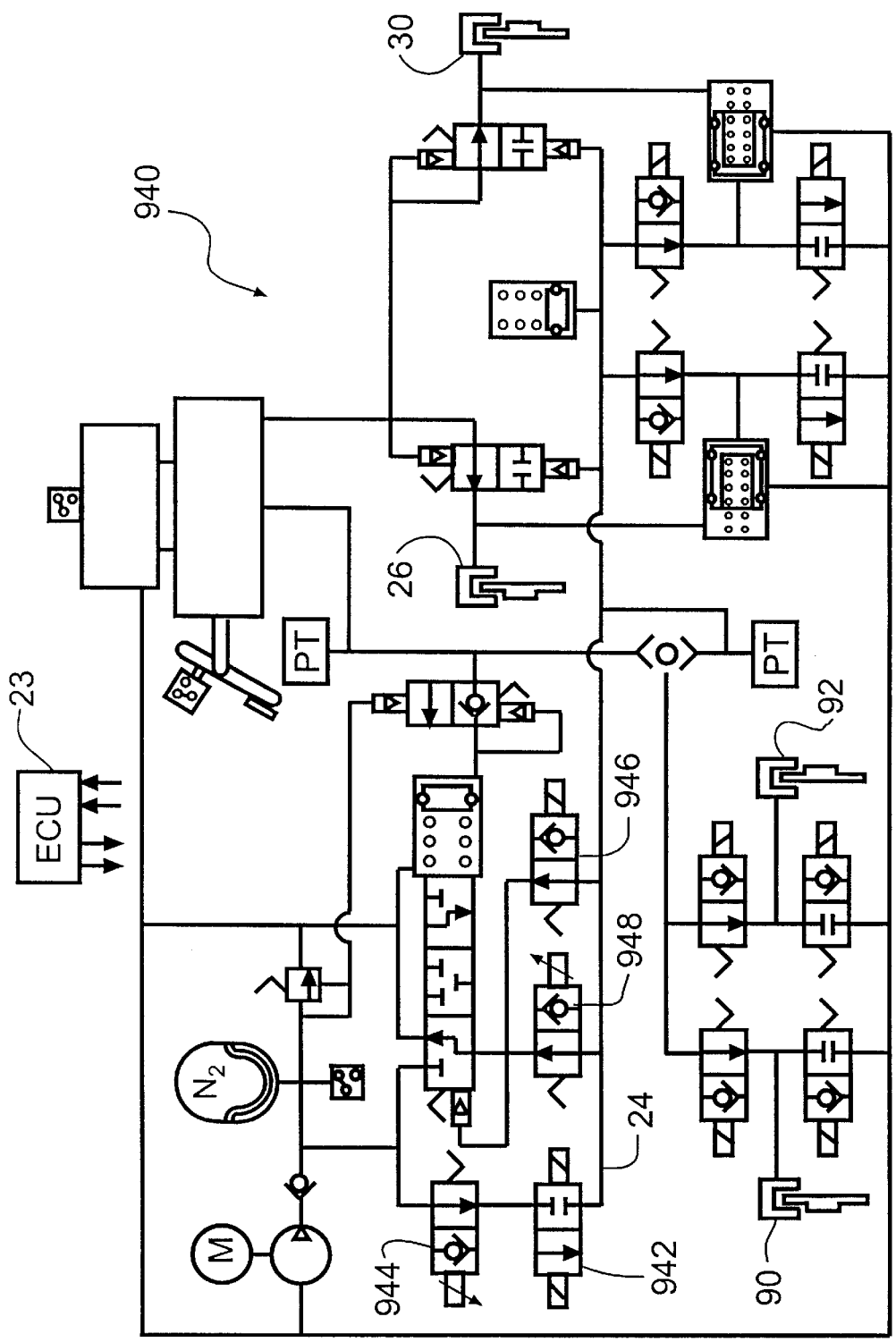
FIG. 18 is a hydraulic schematic of a fourth embodiment of a brake system, in accordance with the present invention.

Referring now to FIG. 18, there is illustrated a fourth embodiment of a brake system, indicated generally at 940, in accordance with the present invention. The brake system 940 is similar to the brake system 10 of FIG. 1, and similar components used in both brake systems 10 and 940 will have similar reference numerals and only the differences or additional components shall be described. The brake system 940 includes a valve 942 and a proportionally controlled valve 944, the combination of which can replace a single proportionally controlled dump valve 156 of the brake system 10. Due to the structure of fluid valves, it may be more economical to use the pair of valves 942 and 944 rather than the single proportionally controlled valve. Similarly, the brake system 940 may include an isolation valve 946 and a proportionally controlled isolation valve 948, the combination of which can replace a single normally open proportionally controlled override isolation valve 154 of the brake system 10, such as for example, economical reasons due to the structure of the various valves. Generally, a single proportionally controlled override isolation valve 154 will need a larger orifice, and therefore a larger solenoid, compared to the isolation valve 948 to operate properly.

Referring now to FIG. 19, there is illustrated a fifth embodiment of a brake system, indicated generally at 950, in accordance with the present invention. The brake system 950 is similar to the brake system 10 of FIG. 1, and similar components used in both brake systems 10 and 950 will have similar reference numerals and only the differences or additional components shall be described. In the brake system 10, the first and second pedal travel simulator valves 140 and 144 provide for manual push through to the wheel brakes 26 and 30 during circumstances such as during a failure of the boost valve 116, a failure of the fluid pressure generator circuit 22, or loss of power to the brake system 10, such as when the ignition system is turned off. The master cylinder 12 is preferably sized to provide adequate braking during these circumstances and accounting for fluid volume displaced by the pedal travel simulator 118. Contrary, the brake system 950 does not include a pedal travel simulator valve, but rather the brake system 950 is designed to provide power to the motor 106 of the pump 104 even when an ignition switch 952 of the vehicle is turned off. Preferably, the brake system 950 includes a separate low cost, low speed, low current draw microprocessor 954 for monitoring the state of the ignition switch 952, the brake switch 27, and the pressure switch 113. Preferably, the microprocessor 954 is powered up at all times, even when the ignition switch 952 is turned off. The microprocessor 954 can be configured to actuate the motor 106 when the pressure switch 113 indicates that the pressure within the conduit 110 falls below a predetermined pressure level, when the ignition switch 952 is off, and when the brake switch 27 is triggered indicating that the driver is depressing the brake pedal 14.

Preferably, the brake system 950 includes a pressure transducer 956 in fluid communication with the conduit 20 to monitor the pressure in the conduit 20 to detect if the master cylinder 12 is properly providing pressure to the conduit 20, during brake apply. Preferably, the boost valve 116 of the brake system 950 is a poppet valve which can function as a high pressure by-pass, thus eliminating the need for a pressure relief valve, such as the pressure relief valve 114 of the brake system 10.

The brake system 950 of FIG. 19 may further include a back-up fluid pressure generator circuit, indicated generally at 958. The back-up fluid pressure generator circuit 958 is similar in function to the back-up fluid pressure generator circuit 840 of the brake system 800 of FIG. 15. The back-up fluid pressure generator circuit 958 generally provides pressurized fluid to the wheel brakes 26 and 30 during certain failure conditions. The back-up fluid pressure generator circuit 958 includes a pump 960 which is driven by a motor 962. The pump 960 has an inlet 960a in fluid communication with the reservoir 16, and an outlet 960b in fluid communication with the first and second base brake valves 28 and 32 via a conduit 964. The pump 960 operates to draw fluid from the reservoir 16 and supply the fluid at an increased pressure to the conduit 964. Preferably, the back-up fluid pressure generator circuit 958 includes a pressure switch 966 (or a pressure transducer) in fluid communication with the supply conduit 24. If the pressure from the fluid pressure generator circuit 22 falls below a predetermined ratio value compared to the pressure generated by the master cylinder 12, the back-up fluid pressure generator circuit 958 may be actuated to provide pressurized fluid to the wheel brakes 26 and 30. Thus, the brake system 950 is especially suited for relatively heavy vehicles, such as medium or heavy duty vehicles, which could require relatively large pedal forces to decelerate the vehicle in case of a failure of the fluid pressure generator circuit 22. If the pressure from the fluid pressure generator circuit 22 falls below the predetermined ratio value, as sensed by the pressure switch 966, the ECU 23 actuates the motor 962 of the pump 960, thereby supplying pressurized fluid to the conduit 964. The pressurized fluid within the conduit 964 causes the first and second base brake valves 28 and 32 to shuttle to their open positions, as illustrated in FIG. 19, thereby supplying pressurized fluid to the wheel brakes 26 and 30.

Preferably, the back-up fluid pressure generator circuit 958 includes an orifice 968 in the conduit 964. The orifice 968 provides a means for self-testing the operation of the pump 960 and the motor 962. For example, preferably when the brake pedal 14 is not depressed, the ECU 23 can actuate the motor 962 for the pump 960 and monitor the pressure within the conduit 964 via the pressure transducer 956 to detect a pressure drop across the orifice 968.

It may be desirable to configure the brake system 950 (or any other brake system embodiments in accordance with the present invention) so that the fluid communication between the master cylinder 12 and the brake circuits 18 and 20 are reversed. For example, as shown in FIG. 19, the conduit 18 is in fluid communication with a primary chamber 12a of the master cylinder 12, and the conduit 20 is in fluid communication with a secondary chamber 12b of the master cylinder 12. It may be desirable to have the conduit 20 be in fluid communication with the primary chamber 12a, and the conduit 18 to be in fluid communication with the secondary chamber 12b. The reversal of the conduits 18 and 20 may be desirable certain for failure conditions of various components of the brake system 950.

Referring now to FIG. 20, there is illustrated a sixth embodiment of a brake system, indicated generally at 970, in accordance with the present invention. The brake system 970 is similar to the brake system 10 of FIG. 1 and the brake system 950 of FIG. 19, and similar components used in the brake systems 10, 950, and 970 will have similar reference numerals and only the differences or additional components shall be described. Preferably, the brake system 970 is configured such that the wheel brake 26 is associated with the left front wheel of the vehicle, the wheel brake 30 is associated with the right front wheel, the wheel brake 90 is associated with the left rear wheel, and the wheel brake 92 is associated with the right rear wheel. The brake system 970 includes a first override dump valve 972 and a first override isolation valve 974 for regulating the flow of pressurized fluid from the conduit 110 of the fluid pressure generator circuit 22 to the wheel brakes 26 and 30, such as for example, during a TC or VSC brake operation. The brake system 970 further includes a second override dump valve 976 and a second override isolation valve 978 for regulating the flow of pressurized fluid from the conduit 110 of the fluid pressure generator circuit 22 to the wheel brakes 90 and 92, such as for example, during a TC or VSC brake operation. Note that the supply conduit 24 branches off into a first supply conduit 24a for supplying fluid to the wheel brakes 26 and 30, and a second supply conduit 24b for supplying fluid to the wheel brakes 90 and 92.

By providing two pairs of override dump and isolation valves, the brake system 970 can subject one of the pairs of wheel brakes to the high pressure in the conduit 110 by actuating the associated override dump and isolation valves, while the other pair of wheel brakes can simultaneously be controlled by the boost valve 116. Contrary, during a VSC brake operation of the brake system 10 of FIG. 1, the wheel brakes not associated with VSC operation are isolated from the boost valve 116 by their respective isolation valves 76, 78, 94, or 96. For example, referring to the brake system 970 illustrated in FIG. 20, if slippage of the wheel corresponding to the first wheel brake 26 is detected, the first override dump valve 972 is actuated to an open position 972a to allow fluid from the conduit 110 to enter the first supply conduit 24a. Also, the first override isolation valve 974 is actuated to a one-way position to prevent the flow of fluid from entering the boost valve 116 via the first supply conduit 24a. The second override dump and isolation valves 976 and 978 are actuated (or remain in their current positions) as shown in FIG. 20, thereby providing a fluid path from the boost valve 116 to the wheel brakes 90 and 92, such as during normal boosted braking. The isolation valve 78 is actuated to its one-way closed position 78b, thereby blocking fluid communication from the first supply conduit 24 to the wheel brake 30. The isolation valve 76 and the dump valve 80 can then be pulsed from the one-way position 76b to the open position 76a as needed.

Figure 21:
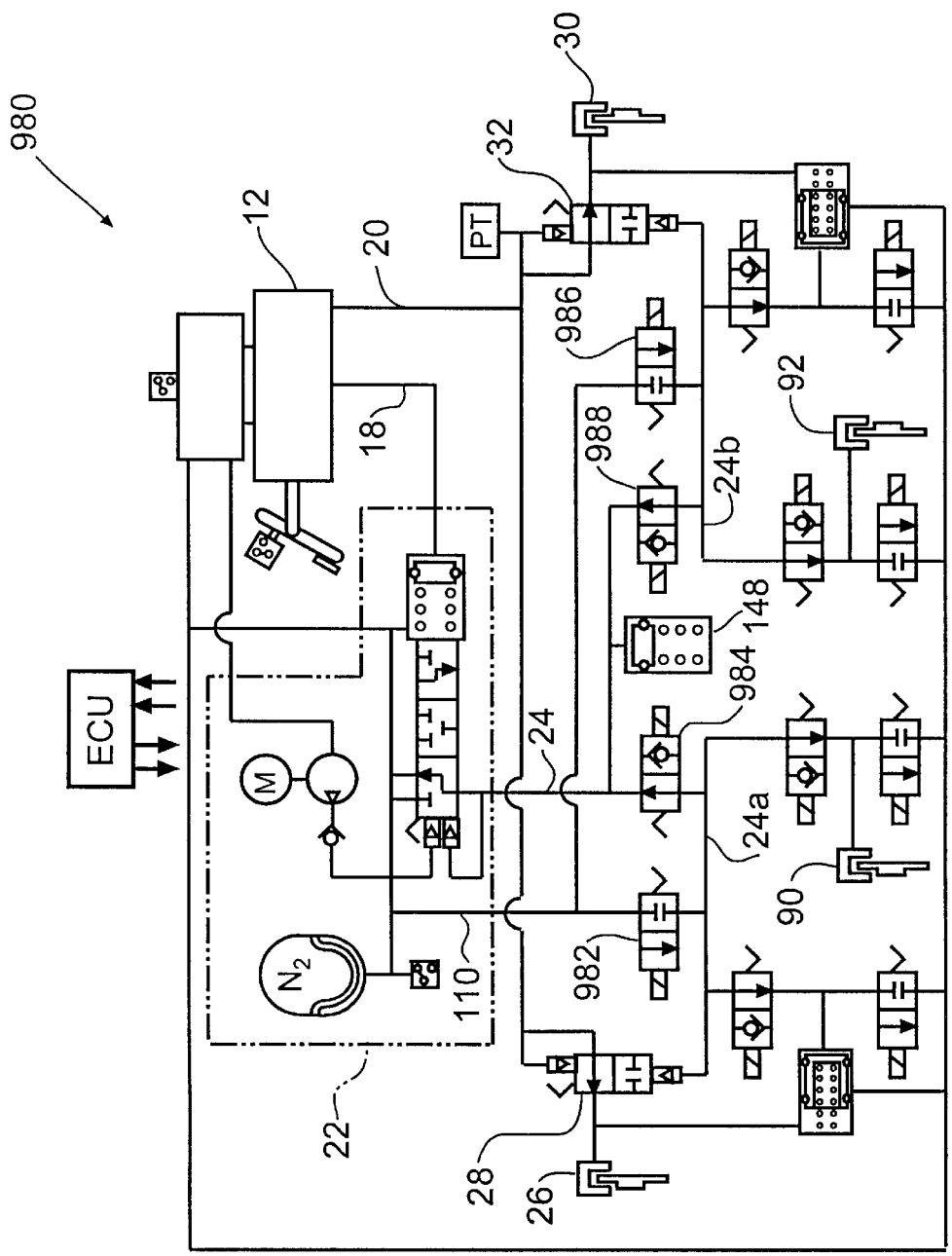
FIG. 21 is a hydraulic schematic of a seventh embodiment of a brake system, in accordance with the present invention.

Referring now to FIG. 21, there is illustrated a seventh embodiment of a brake system, indicated generally at 980, in accordance with the present invention. The brake system 980 is similar to the brake system 10 of FIG. 1 and the brake system 970 of FIG. 20, and similar components used in the brake systems 10, 970, and 980 will have similar reference numerals and only the differences or additional components shall be described. Preferably, the brake system 980 is configured such that the wheel brake 26 is associated with the left front wheel of the vehicle, the wheel brake 30 is associated with the right front wheel, the wheel brake 90 is associated with the right rear wheel, and the wheel brake 92 is associated with the left rear wheel. The brake system 980 includes a first override dump valve 982 and a first override isolation valve 984 for regulating the flow of pressurized fluid from the conduit 110 of the fluid pressure generator circuit 22 to the wheel brakes 26 and 90, such as for example, during a TC or VSC brake operation. The brake system 980 further includes a second override dump valve 986 and a second override isolation valve 988 for regulating the flow of pressurized fluid from the conduit 110 of the fluid pressure generator circuit 22 to the wheel brakes 30 and 92, such as for example, during a TC or VSC brake operation. Note that the supply conduit 24 branches off into a first supply conduit 24a for supplying fluid to the wheel brakes 26 and 90, and a second supply conduit 24b for supplying fluid to the wheel brakes 30 and 92.

The brake system 980 is similar to the brake system 970 of FIG. 20 in that the brake system 980 provides two pairs of override dump and isolation valves for subjecting one of the pairs of wheel brakes to the high pressure in the conduit 110 by actuating the associated override dump and isolation valves, while the other pair of wheel brakes can simultaneously be controlled by the boost valve 116. However, the brake system 980 is preferably configured so that the wheel brakes 26 and 90 are grouped together, while the wheel brakes 30 and 92 are grouped together.

Figure 22:
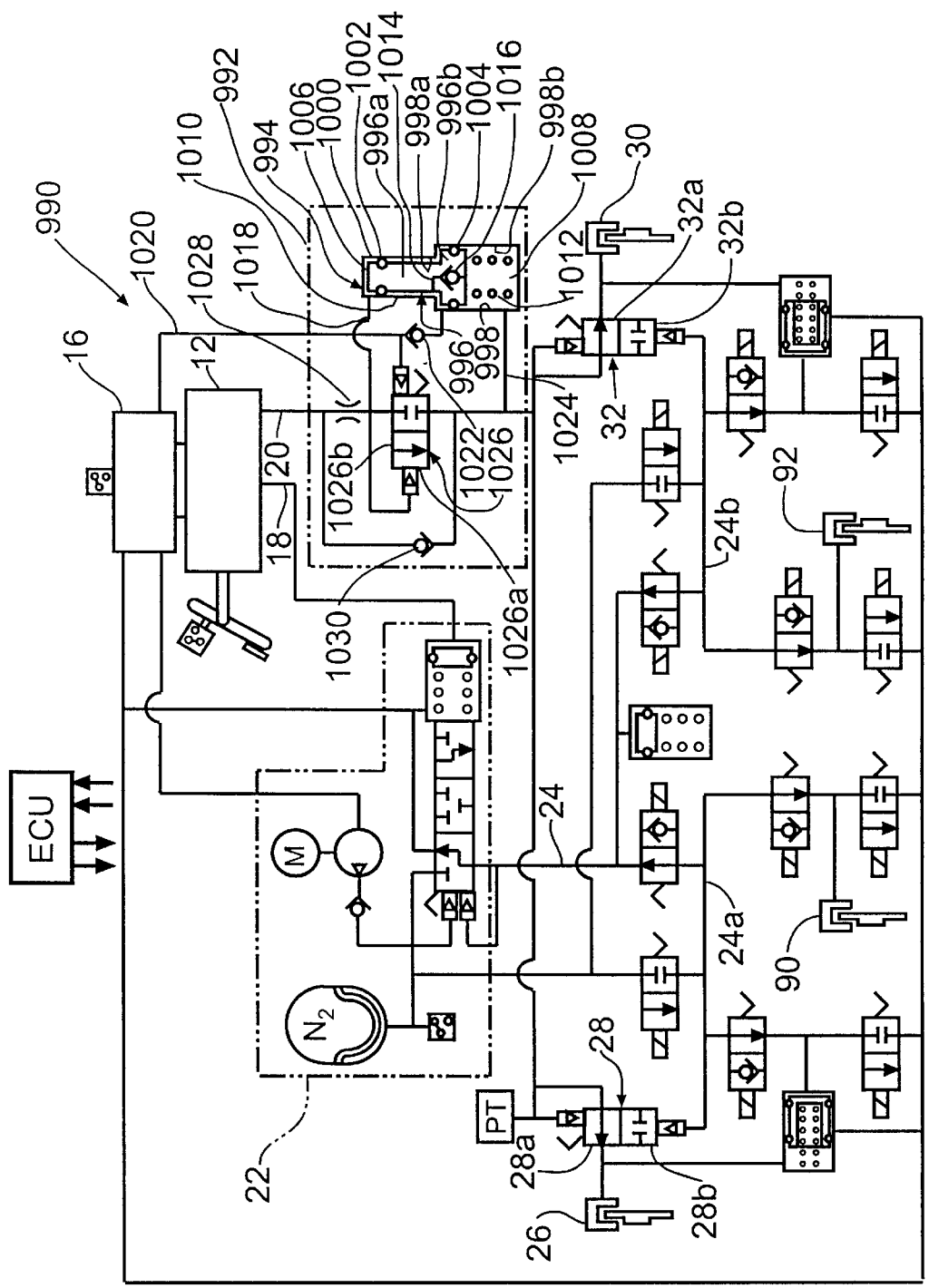
FIG. 22 is a hydraulic schematic of an eighth embodiment of a brake system, in accordance with the present invention.

Referring now to FIG. 22, there is illustrated an eighth embodiment of a brake system, indicated generally at 990, in accordance with the present invention. The brake system 990 is similar to the brake system 10 of FIG. 1 and the brake system 980 of FIG. 21, and similar components used in the brake systems 10, 980, and 990 will have similar reference numerals and only the differences or additional components shall be described. Preferably, the brake system 990 is configured such that the wheel brake 26 is associated with the left front wheel of the vehicle, the wheel brake 30 is associated with the right front wheel, the wheel brake 90 is associated with the right rear wheel, and the wheel brake 92 is associated with the left rear wheel.

The brake system 990 includes a secondary source of pressurized fluid or a secondary fluid supply circuit, indicated generally at 992, for providing a relatively large volume of fluid to be used during various failure conditions of the brake system 990. The secondary fluid supply circuit 992 includes an intensifier, indicated generally at 994. The intensifier 994 includes a stepped piston 996 having a small diameter portion 996a and a large diameter portion 996b. The piston 996 is slidably disposed in a stepped bore 998 formed in a housing 1000. The small diameter portion 996a sealingly engages a wall of a small diameter portion 998a of the bore 998 by a first seal 1002. The large diameter portion 996b sealingly engages a wall of a large diameter portion 998b of the bore 998 by a second seal 1004. The intensifier 994 has a first chamber 1006 which is generally defined by the small diameter portion 998a of the bore 998, the first seal 1002, and the small diameter portion 996a of the piston 996. A second chamber 1008 is generally defined by the large diameter portion 998b of the bore 998, the second seal 1004, and the large diameter portion 996b of the piston 996. An intermediate chamber 1010 is generally defined by the bore 998, the piston 996, and the first and second seals 1002 and 1004. The piston 996 is biased toward the first chamber 1006 by a spring 1012 disposed in the second chamber 1008. A passageway 1014 is formed through the piston 996 and is in fluid communication with the intermediate chamber 1010 and the second chamber 1008. A check valve 1016 is located in the passageway 1014. The check valve 1016 may permit the flow of fluid in a direction from the intermediate chamber 1010 to the second chamber 1008, but restricts the flow of fluid in the opposite direction.

The first chamber 1006 is selectively in fluid communication with the conduit 20 from the master cylinder 12 via a conduit 1018. The intermediate chamber 1010 is in fluid communication with the reservoir 16 via a conduit 1020. A check valve 1022 is located in the conduit 1020 which may allow fluid to flow in a direction from the reservoir 16 to the intermediate chamber 1010, but not in the opposite direction. The second chamber 1008 is in fluid communication with the conduit 20 via a conduit 1024. Located in the conduit 20 between the conduits 1018 and 1024 is a valve 1026. The valve 1026 is movable between a first open position 1026a and a second closed position 1026b. Preferably, the valve 1026 is a normally closed pilot operated, 2 position valve, the operation of which is regulated by the pressure differential between the conduit 20 and the conduit 1020. Preferably, the valve 1026 is configured such that the valve 1026 shuttles to its open position at a relatively high pressure level with the conduit 20.

Under normal boosted braking conditions, the piston 996 of the intensifier generally does not move. The valve 1026 is shuttled to its open position due to the pressure differential between the conduit 1020 from the reservoir 16 and the conduit 20 from the master cylinder 12. The first and second base brake valves 28 and 32 are also shuttled to their closed positions 28b and 32b, respectively, thereby preventing the flow of fluid into the wheel brakes 26 and 30 directly from the conduit 20. However, upon a failure, such as a pressure drop in the conduit 18, the brake system 990 may provide for manual push through to the wheel brakes 26 and 30. For a vehicle installed with wheel brakes 26 and 30 having relatively large fluid displacement, the secondary fluid supply circuit 992 may provide a large volume of fluid for the wheel brakes 26 and 30 to compensate for a loss of fluid caused by failure in the conduit 18, such as a rupture in the conduit 18. For example, during a failed condition in which there is a loss of fluid from a rupture in the conduit 18 prior to a brake apply, the valve 1026 will typically shuttle (or remain) in its closed position 1026b during an initial brake apply. The first and second base brake valves 28 and 32 will shuttle to their open positions 28a and 32a, respectively, to permit the flow of fluid from the conduit 20 into the wheel brakes 26 and 30. The fluid from the conduit 20 will flow into the first chamber 1006 of the intensifier, causing the piston to advance towards the second chamber 1008. Movement of the piston 996 will cause the fluid from the second chamber 1008 to flow into the conduit 20 and into the wheel brakes 26 and 30. Due to the differences in the swept areas between the small diameter portion 996a and the large diameter portion 996b of the piston 996, the volume of fluid exiting the second chamber will be greater than the volume of fluid entering the first chamber 998a from the master cylinder 12. If the driver of the vehicle applies a relatively large force on the brake pedal 14, the pressure within the conduit 20 may cause the valve 1026 to shuttle to its open position 1026a, thereby allowing the pressurized fluid to enter the wheel brakes 26 and 30 via the conduit 20. In another example, if during a relatively hard brake apply operation such that the valve 1026 is shuttled to its open position 1026a and subsequently a rupture in the conduit 18 occurs, the valve 1026 may shuttle to its closed position 1026b due to a pressure drop across the orifice 1028. Fluid will then flow into the first chamber 1006 of the intensifier 994, as described above. The valve 1026 may then subsequently shuttle to its open position 1026a.

The check valves 1016 and 1022 permit the flow of fluid into the intermediate chamber 1010 and allow the piston 996 to retract, i.e., move in a direction towards the first chamber 1006, when the valve 1026 is in its open position 1026a. Preferably, the secondary fluid supply circuit 992 includes an orifice 1028 located in the conduit 20 which is sized accordingly with the first and second base brake valves 28 and 32 so that a sudden spike apply of the master cylinder 12 does not by-pass the secondary fluid supply circuit 992. Preferably, the secondary fluid supply circuit 992 includes a check valve 1030 in a parallel fluid communication with the conduit 20 across the valve 1026. The check valve 1030 permits the flow of fluid in a direction from the wheel brakes 26 and 30 to the master cylinder, such as during a brake release wherein the piston 996 is fully retracted into the first chamber 1006.

Figure 23:
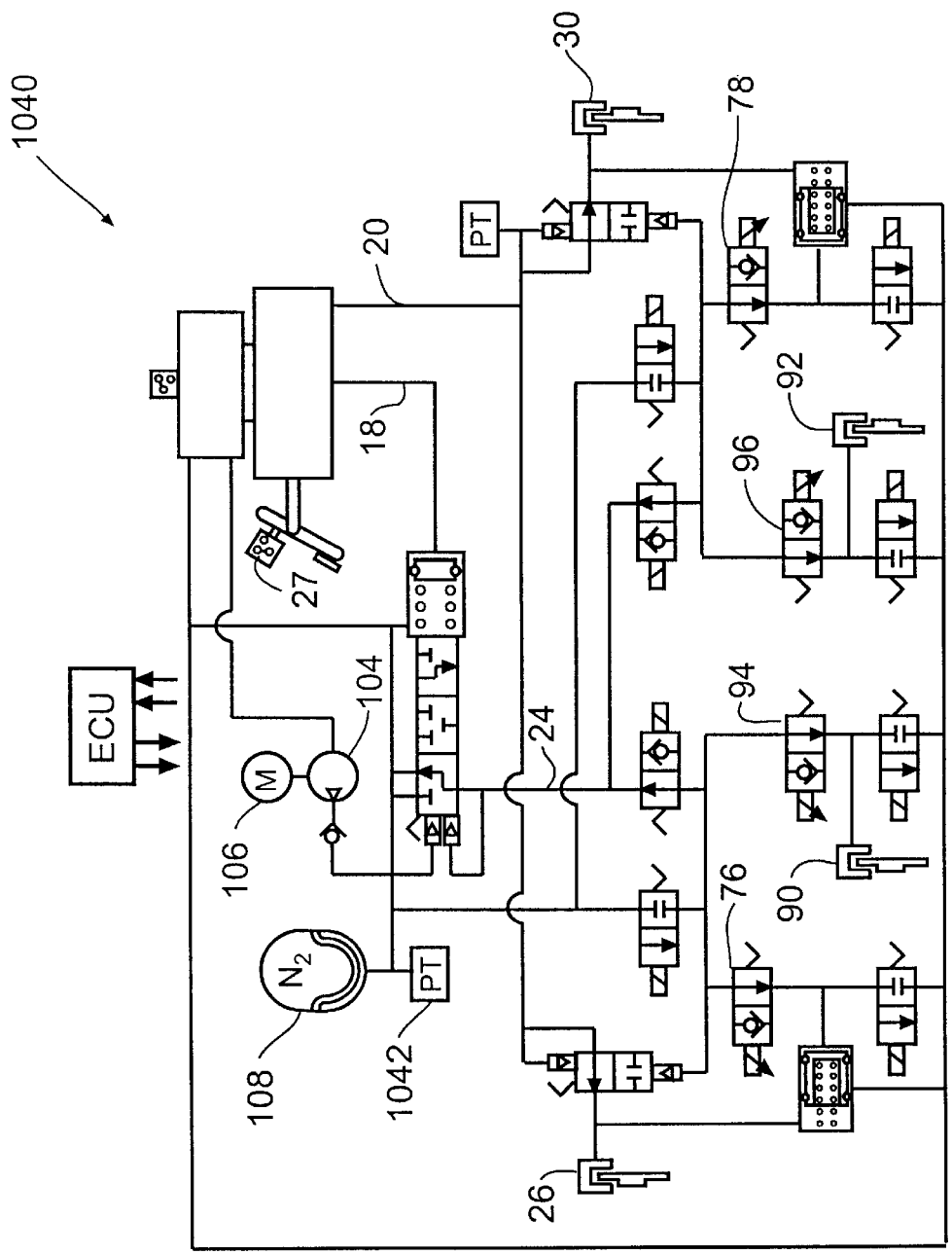
FIG. 23 is a hydraulic schematic of a ninth embodiment of a brake system, in accordance with the present invention.

Referring now to FIG. 23, there is illustrated a ninth embodiment of a brake system, indicated generally at 1040, in accordance with the present invention. The brake system 1040 is similar to the brake system 10 of FIG. 1 and the brake system 980 of FIG. 21, and similar components used in the brake systems 10, 980, and 990 will have similar reference numerals and only the differences or additional components shall be described. The brake system 1040 includes first, second, third, and fourth isolation valves 76, 78, 94, and 96, respectively, which are proportionally controlled. Proportional valves generally provide for improved and refined pressure regulation, compared to the pulsing of binary valves having only an open and a closed position. Due to the fact that the first, second, third, and fourth isolation valves 76, 78, 94, and 96, respectively, are proportionally controlled, the brake system 1040 does not have a compliance accumulator, such as the compliance accumulator 148 of the brake systems 10 and 980. As stated above, the compliance accumulator 148 can provide initial instantaneous flow to the supply conduit 24 until the boost valve 116 can respond with sufficient flow. For example, if the boost valve 116 is designed with an internal dampening system for a valve, such as a poppet valve, to help stabilize the valve, the proportional valve can be controlled to compensate for any lag caused by the internal dampening. Preferably, the brake system 1040 includes a pressure transducer 1042, as opposed to a pressure switch, in fluid communication with the high pressure accumulator 108 to provide better feedback for controlling the proportionally controlled valves 76, 78, 94, and 96. Also, the pressure transducer 1042 provides means for detecting whether or not the fluid in the conduit 20 is leaking. For example, if a fluid leak is present in the conduit 20, the pressure transducer 1042 in cooperation with the brake switch 27, will detect the pressure in the conduit 110 for determining that the motor 104 is actuated to compensate for a leak in the conduit 20, rather that to supply pressurized fluid during a brake apply.

In certain circumstances it may be desirable to alter the pedal effort required by the operator of the above described brakes systems so that the boost ratio changes rather than remaining generally constant throughout the travel length of the brake pedal. This can be accomplished by using a boost valve having a non-linear boost gain, wherein the boost ratio changes according to the travel length of the brake pedal or the force applied to the brake pedal. For example, it may be desirable to have low pedal effort and a relatively high boost gain at low decelerations, and a higher pedal effort and lower boost gain at higher decelerations. Having high boost gain at low decelerations, such as initial braking, can assist the force required to overcome the force of the pedal return springs (such as the springs 224, 226, and 258 of the brake system 10 of FIG. 1) and internal seal friction of the components of the brake system which occur during initial braking. However, having high boost gain at high decelerations may be overly sensitive.

Figure 24:
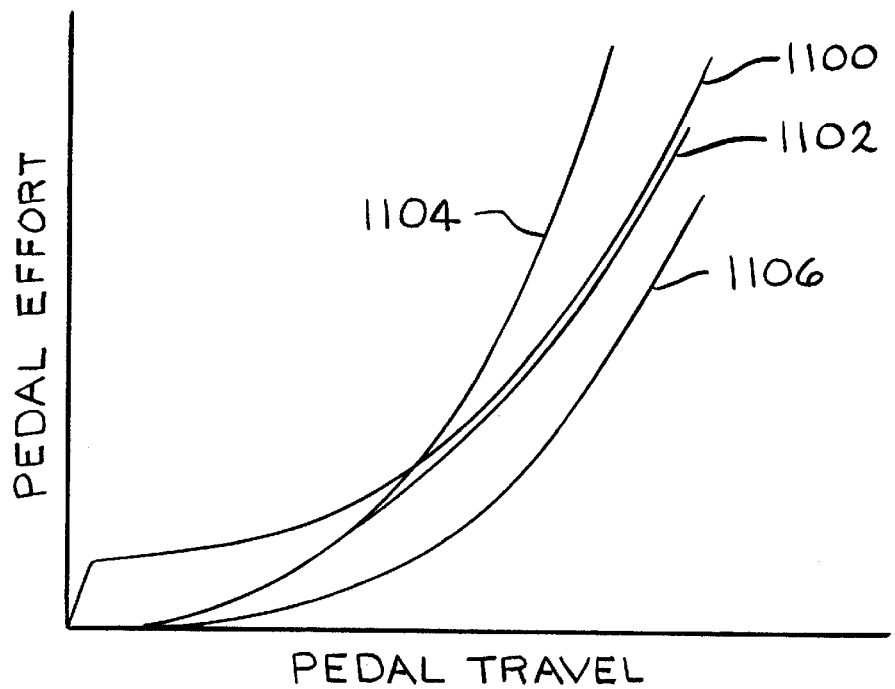
FIG. 24 is a graphical plot illustrating a desired curve for boosted pressure curve having a non-linear gain.

To illustrate the above example, there is shown in FIG. 24, a plot 1100 representing the pedal effort exerted by the operator of the brake system on the brake pedal as a function of the travel length of the brake pedal. Note that the relatively steep initial slope results from the preload of the springs and the internal seal friction of the master cylinder, the pedal travel simulator, and the boost valve of the brake system. A plot 1102 is an example of a desired boosted pressure curve having a nonlinear gain. A plot 1104 illustrates an example of a boosted pressure curve having a linear gain which has a desirable characteristic at lower pedal travels, but rapidly departs from the desired curve at higher pedal travel lengths. A plot 1106 illustrates another example of a boosted pressure curve having a linear gain which has a desirable characteristic at higher pedal travels, but not at lower pedal travels.

Figure 25:
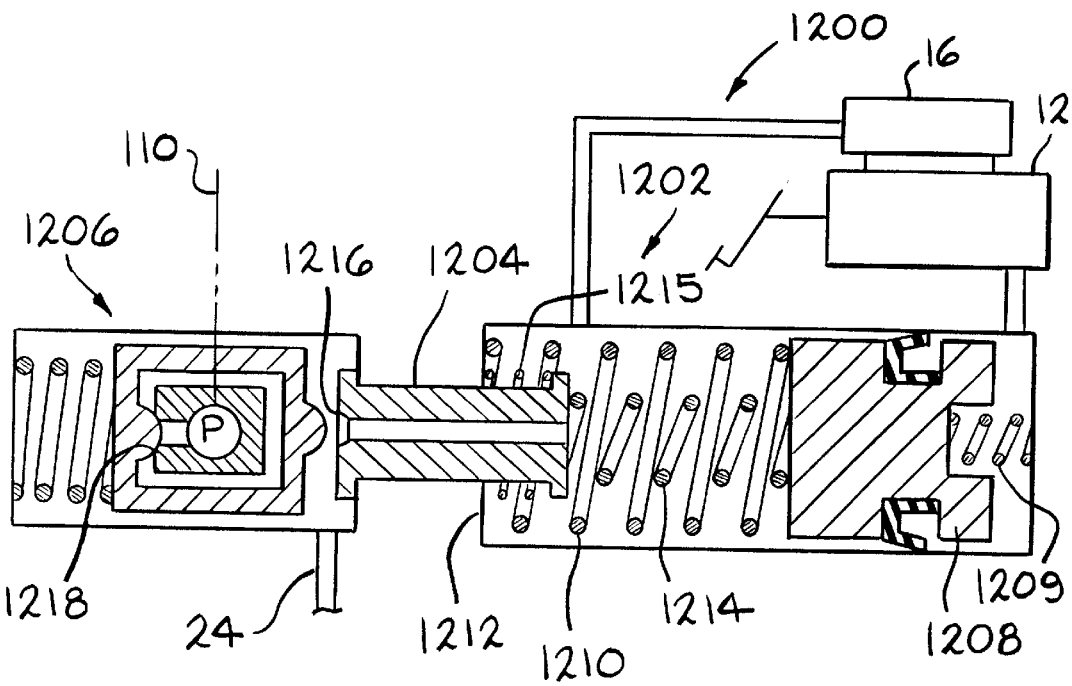
FIG. 25 is a schematic illustration of a brake system having a non-linear boost gain.

There is shown in FIG. 25 a schematic illustration of a brake system 1200, having a non-linear boost gain. The brake system 1200 includes a pedal travel simulator 1202, a reaction spool 1204, and a boost valve 1206. The pedal travel simulator 1202 includes a piston 1208. The piston 1208 is biased in a leftward direction, as viewing FIG. 25, by a spring 1209. The piston 1208 is biased in a rightward direction by a first spring 1210 acting against a housing wall 1212. A second spring 1214 also biases the piston 1208 in a rightward direction, and acts against the reaction spool 1204. A spring 1215 biases the spool 1204 rightward. The boost valve has a pair of valve seats 1216 and 1218, which correspond to the valve seats 244 and 281 of the boost valve 200 of FIG. 2. If at least one of the springs 1210 or 1214 is a progressive rate spring, as described above with respect to the spring 576 of the boost valve 550 illustrated in FIG. 10, the boost valve 1206 would have a non-linear boost gain characteristic.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A brake system comprising:
 a master cylinder for generating pressurized fluid into a fluid conduit;
 a wheel brake in fluid communication with said master cylinder;
 a pedal travel simulator having:
  a housing having a bore formed therein;
  a piston slidably disposed in said bore, said piston and said housing generally defining a fluid chamber being in fluid communication with said fluid conduit; and
  a spring biasing said piston in a direction to contract said fluid chamber;
 a source of pressurized fluid;
 a boost valve in fluid communication with said source of pressurized fluid and said wheel brake, said boost valve being actuated by said spring of said pedal travel simulator to supply pressurized fluid from said source of pressurized fluid to said wheel brake via a supply conduit at a pressure ratio greater than fluid pressure generated by said master cylinder; and
 a pedal travel simulator valve for regulating the flow of fluid in said fluid conduit, said pedal travel simulator valve being movable between a first position wherein fluid is permitted to flow between said master cylinder and said fluid chamber of said pedal travel simulator, and a second position wherein fluid is prevented from flowing in a direction from said master cylinder to said fluid chamber of said pedal travel simulator.

2. The brake system of claim 1, wherein said boost valve includes a poppet valve, and wherein said spring of said pedal travel simulator mechanically actuates said poppet valve.

3. The brake system of claim 1, wherein said boost valve includes a spool valve, and wherein said spring of said pedal travel simulator mechanically actuates said spool valve.

4. The brake system of claim 1, wherein said boost valve is located remotely from said master cylinder.

5. The brake system of claim 1, wherein said spring of said pedal travel simulator has a progressive spring rate characteristic.

6. The brake system of claim 1, wherein said pedal travel simulator valve is a pilot operated valve responsive to pressure differential between the fluid from said source of pressurized fluid and the fluid in said fluid chamber of said pedal travel simulator.

7. The brake system of claim 1 further including a base brake valve for regulating the flow of fluid between said master cylinder and said wheel brake.

8. The brake system of claim 7, wherein said base brake valve is a pilot operated valve responsive to pressure differential between the fluid from said master cylinder and the fluid in said supply conduit.

9. The brake system of claim 8, wherein said base brake valve is movable between a first position, wherein fluid is permitted to flow between said master cylinder and said wheel brake, and wherein fluid is prevented from flowing between said master cylinder and said wheel brake.

10. The brake system of claim 1, wherein said source of pressurized fluid includes:
a hydraulic pump;
a motor for operating said pump; and
an accumulator in fluid communication with said pump and said boost valve for storage of pressurized fluid.

11. The brake system of claim 1 further including a shuttle valve in fluid communication with said master cylinder, said supply conduit, and said wheel brake, said shuttle valve being movable between a first position wherein the flow of fluid is restricted in a direction from said wheel brake to said master cylinder, and the flow of fluid is permitted between the supply conduit and the wheel brake, and a second position wherein the flow of fluid is restricted in a direction from the wheel brake to said supply conduit, and the flow of fluid is permitted between the master cylinder and the wheel brake.

12. The brake system of claim 11, wherein said shuttle valve includes first and second valve seats and a ball movable between said first and second valve seats.

13. The brake system of claim 1 further including a compliance accumulator in fluid communication with said supply conduit, said compliance accumulator capable of storing pressurized fluid.

14. The brake system of claim 1 further including a fluid separator assembly between said master cylinder and said wheel brake for isolating the fluid therebetween.

15. The brake system of claim 1, wherein said boost valve has a non-linear boost gain such that said pressure ratio changes with respect to the pressure generated by said master cylinder.

16. The brake system of claim 1 further including a second source of pressurized fluid in fluid communication with said master cylinder and said wheel brake.

17. The brake system of claim 16, wherein said second source of pressurized fluid includes a second hydraulic pump and a second motor for operating said pump.

18. The brake system of claim 1 further including a solenoid operated override valve for regulating the flow of fluid between said supply conduit and said wheel brake.

19. The brake system of claim 18, wherein said override valve is proportionally controlled.

20. The brake system of claim 1 further including:
a fluid reservoir in fluid communication with said master cylinder;
an isolation valve movable between a first position wherein the flow of fluid is permitted between said supply conduit and said wheel brake, and a second position wherein fluid is restricted from flowing in a direction from said supply conduit to said wheel brake; and
a dump valve movable between a first position wherein the flow of fluid is prevented between said wheel brake and said reservoir, and a second position wherein the flow of fluid is permitted between said wheel brake and said reservoir.

21. The brake system of claim 1 further including an intensifier having:
an intensifier housing having a second bore formed therein, said second bore having a first portion and a second portion having a larger diameter than said first portion;
a second piston slidably disposed in said second bore, said second piston having a first portion and a second portion having a larger diameter than said first portion, said first portion slidably disposed in said first portion of said second bore, said second portion of said second piston slidably disposed in said second portion of said second bore;
a first seal sealingly engaging said first portion of said second piston to a first wall of said first portion of said second bore;
a second seal sealingly engaging said second portion of said second piston to a second wall of said second portion of said second bore;
wherein a first fluid chamber is generally defined by said first portion of said second bore, said first seal, and said first portion of said second bore, said first fluid chamber being in fluid communication with said master cylinder;
wherein a second fluid chamber is generally defined by said second portion of said second bore, said second seal, and said second portion of said second piston, said second fluid chamber being in fluid communication with said wheel brake;
wherein an intermediate fluid chamber is generally defined by said first and second seals, said second bore, and said second piston, said intermediate fluid chamber being in fluid communication with a fluid reservoir; and
a spring biasing said second piston in a direction so as to contract said first fluid chamber.

22. The brake system of claim 21, wherein said intensifier further includes a check valve housed in said second piston, said check valve permitting the flow of fluid from said intermediate fluid chamber to said second fluid chamber.

23. The brake system of claim 21 further including a third valve movable between a first position preventing the flow of fluid between said master cylinder and said wheel brake, and a second position allowing the flow of fluid between said master cylinder and said wheel brake.

24. A brake system comprising:
a master cylinder for generating pressurized fluid;
a wheel brake in fluid communication with said master cylinder;
a reservoir in fluid communication with said master cylinder;
a pedal travel simulator having:
a housing having a first bore formed therein;
a piston slidably disposed in said first bore, said piston and said housing generally defining a fluid chamber being in fluid communication with said master cylinder; and
a spring biasing said piston in a direction to contract said fluid chamber;
a source of pressurized fluid;
a reaction spool having first and second ends and a second bore formed therethrough, said first end engaging said second end of said spring of said pedal travel simulator, said second bore of said reaction spool being in fluid communication with said reservoir; and a boost valve having:
- a valve body having first and second valve chambers, said first valve chamber in fluid communication with said wheel brakes, said second valve chamber in fluid communication with said source of pressurized fluid;
- a sleeve member fixed relative to said valve body, said sleeve member having a first end having a third bore formed therein, said third bore being in fluid communication with said source of pressurized fluid;
- a poppet valve assembly movable relative to said sleeve member between a first position and a second position, said poppet valve having first and second ends;
- a first valve member defined by the cooperation of said second end of said reaction spool and said first end of said poppet valve assembly; and
- a second valve member defined by the cooperation of said first end of said sleeve member and said second end of said poppet valve assembly;
- wherein when said poppet valve assembly is in said first position, said first valve member allows the flow of fluid between said second bore of said reaction spool and said first valve chamber, and wherein said second valve member restricts the flow of fluid between said second valve chamber and said source of pressurized fluid; and
- wherein when said poppet valve assembly is in said second position, said first valve member restricts the flow of fluid between said bore of said reaction spool and said first valve chamber, and wherein said second valve member allows the flow of fluid between said second valve chamber and said source of pressurized fluid.

25. The brake system of claim 24, wherein said second bore of said reaction spool defines an axis, said first and second valve members being aligned with said axis.

26. The brake system of claim 24, wherein said first valve member includes a valve seat formed in said second end of said reaction spool which cooperates with a rounded end formed in said first end of said poppet valve assembly.

27. The brake system of claim 26, wherein said rounded end of said first end of said poppet valve assembly is a ball press fit into a bore formed in said first end of said poppet valve assembly.

28. The brake system of claim 24, wherein said second valve member includes a valve seat formed in said first end of said sleeve member which cooperates with a rounded end formed in said second end of said poppet valve assembly.

29. The brake system of claim 28, wherein said rounded end of said first end of said second end of said poppet valve assembly is a ball press fit into a bore formed in said second end of said poppet valve assembly.

30. A boost valve in fluid communication with a source of pressurized fluid and engaged with a reaction spool having a bore formed therethrough, the reaction spool being engaged with a spring of a pedal travel simulator, said boost valve comprising:
- a valve body having first and second valve chambers;
- a sleeve member fixed relative to said valve body, said sleeve member having a first end having a bore formed therein;
- a poppet valve assembly movable relative to said sleeve member between a first position and a second position, said poppet valve having first and second ends;
- a first valve member defined by the cooperation of the reaction spool and said first end of said poppet valve assembly; and
- a second valve member defined by the cooperation of said first end of said sleeve member and said second end of said poppet valve assembly;
- wherein when said poppet valve assembly is in said first position, said first valve member allows the flow of fluid between the bore of the reaction spool and said first valve chamber, and wherein said second valve member restricts the flow of fluid between said second valve chamber and the source of pressurized fluid; and
- wherein when said poppet valve assembly is in said second position, said first valve member restricts the flow of fluid between the bore of the reaction spool and said first valve chamber, and wherein said second valve member allows the flow of fluid between said second valve chamber and the source of pressurized fluid.

31. The boost valve of claim 30, wherein said bore of said reaction spool defines an axis, said first and second valve members being aligned with said axis.

32. The boost valve of claim 30, wherein said first valve member includes a valve seat formed in said second end of said reaction spool which cooperates with a rounded end formed in said first end of said poppet valve assembly.

33. The boost valve of claim 32, wherein said rounded end of said first end of said poppet valve assembly is a ball press fit into a bore formed in said first end of said poppet valve assembly.

34. The boost valve of claim 30, wherein said second valve member includes a valve seat formed in said first end of said sleeve member which cooperates with a rounded end formed in said second end of said poppet valve assembly.

35. The boost valve of claim 34, wherein said rounded end of said first end of said second end of said poppet valve assembly is a ball press fit into a bore formed in said second end of said poppet valve assembly.

* * * * *